US009832308B1

(12) United States Patent
Rogers et al.

(10) Patent No.: US 9,832,308 B1
(45) Date of Patent: Nov. 28, 2017

(54) CALLER PREVIEW DATA AND CALL MESSAGES BASED ON CALLER PREVIEW DATA

(71) Applicant: Google Inc., Mountain View, CA (US)

(72) Inventors: Alan Lee Rogers, Seattle, WA (US); Richard Yuan-Ching Lo, Fremont, CA (US); Matthew Thomas Austin, Palo Alto, CA (US); Justin Uberti, Mountain View, CA (US); Heidi Rafael Sales, Seattle, WA (US); Koa Metter, Seattle, WA (US); Anton Volkov, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 15/466,806

(22) Filed: Mar. 22, 2017

Related U.S. Application Data

(63) Continuation-in-part of application No. 15/153,684, filed on May 12, 2016.

(51) Int. Cl.
*H04M 3/42* (2006.01)
*H04W 4/14* (2009.01)
*H04N 7/14* (2006.01)

(52) U.S. Cl.
CPC ........ *H04M 3/42051* (2013.01); *H04N 7/147* (2013.01); *H04W 4/14* (2013.01)

(58) Field of Classification Search
CPC combination set(s) only.
See application file for complete search history.

(56) References Cited

U.S. PATENT DOCUMENTS

| 6,853,911 | B1 | 2/2005 | Sakarya |
| 8,644,886 | B1 | 2/2014 | Delaney et al. |
| 8,676,273 | B1 | 3/2014 | Fujisaki |
| 8,831,191 | B1 | 9/2014 | Vendrow |
| 8,958,537 | B1 * | 2/2015 | Saylor ............... H04M 3/42068 379/142.04 |
| 2005/0015444 | A1 * | 1/2005 | Rambo ................... H04N 7/15 709/204 |

(Continued)

OTHER PUBLICATIONS

European Patent Office, International Search Report for International Patent Application No. PCT/US2016/068440, dated Apr. 10, 2017, 6 pages.

(Continued)

*Primary Examiner* — Joseph J Nguyen
(74) *Attorney, Agent, or Firm* — IP Spring

(57) ABSTRACT

Implementations of the present application relate to caller preview data and call messages based on caller preview data. In some implementations, a method includes sending, by a caller device, a call request to one or more callee devices, and establishing a connection to at least one callee device prior to receipt of an acceptance of the call request by the callee device. At least a portion of caller preview data is transmitted to the callee device over the connection prior to the receipt of the call acceptance. In response to determining that the at least a portion of the caller preview data has been transmitted for a particular time period without receipt of the acceptance of the call request, information is transmitted to instruct a call message to be stored on the callee device, where the call message includes at least a part of the caller preview data.

19 Claims, 11 Drawing Sheets

(56) References Cited

U.S. PATENT DOCUMENTS

| | | |
|---|---|---|
| 2005/0143103 A1 | 6/2005 | Bjorgan et al. |
| 2006/0203802 A1 | 9/2006 | Chou et al. |
| 2007/0263825 A1* | 11/2007 | Shah .................... G06Q 10/109 379/202.01 |
| 2008/0143816 A1 | 6/2008 | Zhang et al. |
| 2008/0159522 A1 | 7/2008 | Ericson |
| 2009/0147772 A1 | 6/2009 | Rao et al. |
| 2010/0130213 A1 | 5/2010 | Vendrow et al. |
| 2010/0159909 A1 | 6/2010 | Stifelman |
| 2010/0309282 A1 | 12/2010 | Hsieh |
| 2011/0076003 A1 | 3/2011 | Cho et al. |
| 2012/0026274 A1 | 2/2012 | Baker et al. |
| 2012/0098919 A1 | 4/2012 | Tang et al. |
| 2012/0268552 A1 | 10/2012 | Choi et al. |
| 2013/0027504 A1 | 1/2013 | Zhang |
| 2013/0083155 A1 | 4/2013 | Andresen |
| 2013/0183947 A1 | 7/2013 | Bana |
| 2013/0321553 A1 | 12/2013 | Lindberg et al. |
| 2013/0329000 A1 | 12/2013 | Cain et al. |
| 2013/0342637 A1 | 12/2013 | Felkai et al. |
| 2014/0111596 A1 | 4/2014 | Grevers, Jr. |
| 2014/0176659 A1 | 6/2014 | Khay-Ibbat et al. |
| 2014/0245180 A1 | 8/2014 | Kuramura et al. |
| 2015/0215579 A1 | 7/2015 | Wang et al. |

OTHER PUBLICATIONS

European Patent Office, Written Opinion for International Patent Application No. PCT/US2016/068440, dated Apr. 10, 2017, 8 pages.

USPTO, Notice of Allowance for U.S. Appl. No. 15/153,684, dated Apr. 20, 2017, 17 pages.

USPTO, Non-final Office Action for U.S. Appl. No. 15/153,684, dated Dec. 22, 2016, 10 pages.

USPTO, First Action Interview, Pre-Interview Communication for U.S. Appl. No. 15/153,684, dated Jul. 27, 2016, 5 pages.

* cited by examiner

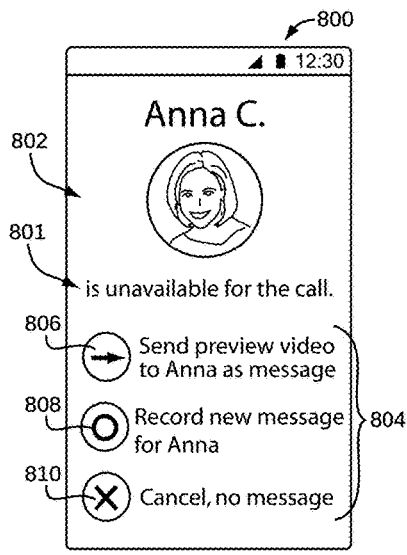
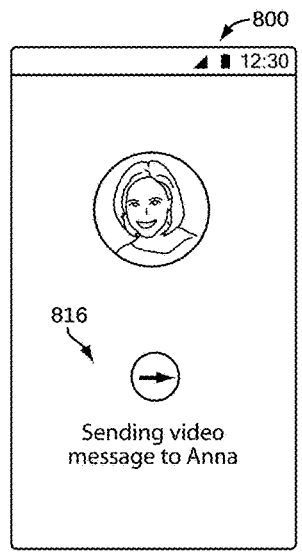
FIG. 8A    FIG. 8B    FIG. 8C
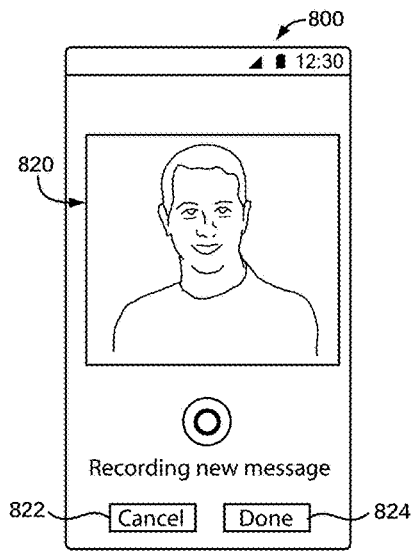
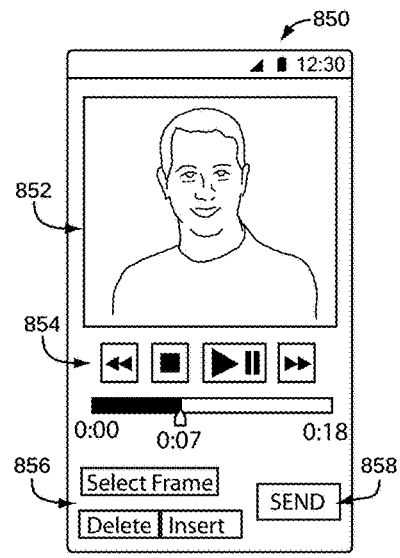
FIG. 8D    FIG. 8E

CALLER PREVIEW DATA AND CALL MESSAGES BASED ON CALLER PREVIEW DATA

CROSS-REFERENCE TO RELATED APPLICATIONS

This application is a continuation-in-part of U.S. patent application Ser. No. 15/153,684, titled CALLER PREVIEW FOR VIDEO CALLS and filed on May 12, 2016, which is incorporated by reference herein in its entirety.

BACKGROUND

The popularity and convenience of digital devices as well as the widespread of use of Internet communications have caused digital images and videos to become ubiquitous. Users of digital devices engage in many different forms of communication, including text chat, email, voice calls, and video calls. For example, video calls can be established between devices to provide, to the participants of the call, audio communication as well as video images depicting the participants.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

Implementations of the present application relate to caller preview data and call messages based on caller preview data. In some implementations, a method includes sending, by a caller device, a call request to one or more callee devices, and establishing a connection to at least one callee device of the one or more callee devices prior to receipt of an acceptance of the call request by the at least one callee device. At least a portion of caller preview data is transmitted to the at least one callee device over the connection prior to the receipt of the acceptance of the call request. In response to determining that the at least a portion of the caller preview data has been transmitted over the connection for a particular time period without the receipt of the acceptance of the call request, the method transmits information to the at least one callee device that instructs that a call message be stored on the at least one callee device, where the call message includes at least a part of content of the caller preview data.

Various implementations and examples of the method are described. For example, in various different implementations, the caller preview data includes video data exclusive of audio data, audio data exclusive of video data, or both audio and video data. In some examples, the caller preview data includes a caller preview video, and the call message includes a plurality of frames of the caller preview video. For example, the caller preview data can be a live video created from frames captured by a camera in communication with the caller device. In some implementations, the call message includes a text message that includes text associated with audio data included in the caller preview data.

In some implementations, the method further includes storing the caller preview data in storage of the caller device, where transmitting the information to the at least one callee device includes transmitting the call message to the at least one callee device over the connection. For example, in some implementations, at least a part of the caller preview data included in the call message can be at least one of audio data and video data at a different resolution than audio data and video data in the transmitted portion of the caller preview data. In some implementations, transmitting the information to the at least one callee device includes transmitting a command to the at least one callee device over the connection, where the command instructs the at least one callee device to store the transmitted at least a portion of the caller preview data as the call message. For example, in some implementations, the method further includes transmitting an additional portion of the caller preview data to the at least one callee device, where the command instructs the at least one callee device to combine the additional portion with the transmitted at least a portion of the caller preview data as the call message.

In some implementations, the method can further include causing capture of the caller preview data by one or more cameras in communication with the caller device, and providing an automatic suggestion on the caller device requesting user input that indicates whether the caller preview data is to be provided as the call message, where the automatic suggestion is provided in response to determining that one or more particular content features are included in one or more portions of the caller preview data, and/or determining that a particular social relationship exists between a caller of the caller device and at least one callee of the at least one callee device. In some implementations, the method can further include obtaining the caller preview data from a camera of the caller device that captures the caller preview data, and causing output by the caller device of an indication that the caller preview data is being stored on the caller device, where the at least a part of the caller preview data is available to be provided as the call message.

The method can further include, in response to determining that the caller preview data has been transmitted over the connection for the particular time period without receiving the acceptance of the call request, causing display of a plurality of options by the caller device, where the options include a first option to use the at least a part of the caller preview data as the call message, where transmitting the information to the at least one callee device is performed in response to receiving the first input selecting the first option. The options can include a second option to reject including the at least a part of the caller preview data in the call message and, in response to receiving second input selecting the second option, determination of a new call message by the caller device is caused to be initiated. In some examples, causing display of the plurality of options includes causing display of a user interface by the caller device including one or more controls receptive to third input from the user and configured to cause output of one or more portions of the caller preview data by the caller device prior to transmitting the information to the at least one callee device.

In some implementations, the method further includes receiving edit input from a caller of the caller device and editing the caller preview data based on the edit input to generate edited caller preview data, where the edited caller preview data is transmitted to the callee device as the call message. For example, the caller preview data can include sequential data, and receiving the edit input can include receiving one or more selections of: a start point of the caller preview data, such that portions of the sequential data prior to the start point are caused to be excluded from the caller preview data, and/or an end point of the caller preview data, such that portions of the sequential data after the end point are caused to be excluded from the caller preview data. The method can further include automatically verifying that one or more visual features are depicted in pixels in one or more frames of the caller preview data, wherein causing the call message to be stored on the at least one callee device is performed in response to verifying that the one or more visual features are depicted. The method can further include automatically determining one or more content features depicted in the caller preview data, and automatically modifying the caller preview data to generate modified caller preview data, where the modified caller preview excludes one or more portions of the caller preview data that include the one or more content features, and the modified caller preview data is included in the information transmitted to the at least one callee device. In some implementations, the method further includes detecting speech in audio data associated with the caller preview data, obtaining one or more text captions corresponding to the speech, where each text caption corresponds to a portion of the speech, and causing particular text captions to be inserted into respective frames of the caller preview data that are associated with the portions of the speech corresponding to the particular text captions. In some implementations, the caller preview data includes multiple frames of a caller preview video, and transmitting the information includes selecting a plurality of frames of the multiple frames to transmit, where the plurality of frames are fewer in number than the multiple frames of the caller preview data, and sending the plurality of frames to the at least one callee device as the call message.

In some implementations, a device can include a storage device and at least one processor configured to access the storage device. The processor is configured to perform operations including sending, by a caller device, a call request to one or more callee devices and establishing a connection to at least one callee device of the one or more callee devices prior to receipt of an acceptance of the call request by the at least one callee device. The operations include storing at least a portion of caller preview data captured by the caller device, where the caller preview data includes at least one of video data and audio data, and transmitting at least a portion of the caller preview data to the at least one callee device over the connection, where the at least a portion of the caller preview data is transmitted prior to the receipt of the acceptance of the call request. The operations include, in response to determining that the at least a portion of the caller preview data has been transmitted over the connection and the acceptance of the call request has not been received, transmitting a call message over the connection to the at least one callee device, where the call message includes at least a part of the caller preview data.

In some implementations, a method comprises receiving, by a callee device, a call request from a caller device, establishing a connection to the caller device prior to sending an acceptance of the call request by the callee device, receiving caller preview data at the callee device over the connection, where the at least a portion of the caller preview data is received prior to the sending of the acceptance of the call request by the callee device, causing output of the caller preview data by the callee device, and, in response to the caller preview data being received over the connection for a particular time period without the sending of the acceptance of the call request, causing a call message to be stored in storage of the callee device, where the call message includes at least a part of the caller preview data. Various implementations and examples of the method are described. For example, in some implementations, the method further comprises causing display of an audio output option at the callee device in association with the caller preview data, where the audio output option is responsive to user selection to cause audio data associated with the caller preview data to be output by the callee device. In response to the caller preview data being received over the connection for the particular time period without the sending of the acceptance of the call request, the call message is received from the caller device. In some implementations, causing output of the caller preview data by the callee device includes causing audio output by the callee device based on the caller preview data in place of ringtone audio output caused by ringtone data accessible to the callee device.

BRIEF DESCRIPTION OF THE DRAWINGS

FIGS. 8A-8E are diagrammatic illustrations of example representations of a user interface showing one or more call message features described herein for a caller, according to some implementations;

DETAILED DESCRIPTION

Figure 1:
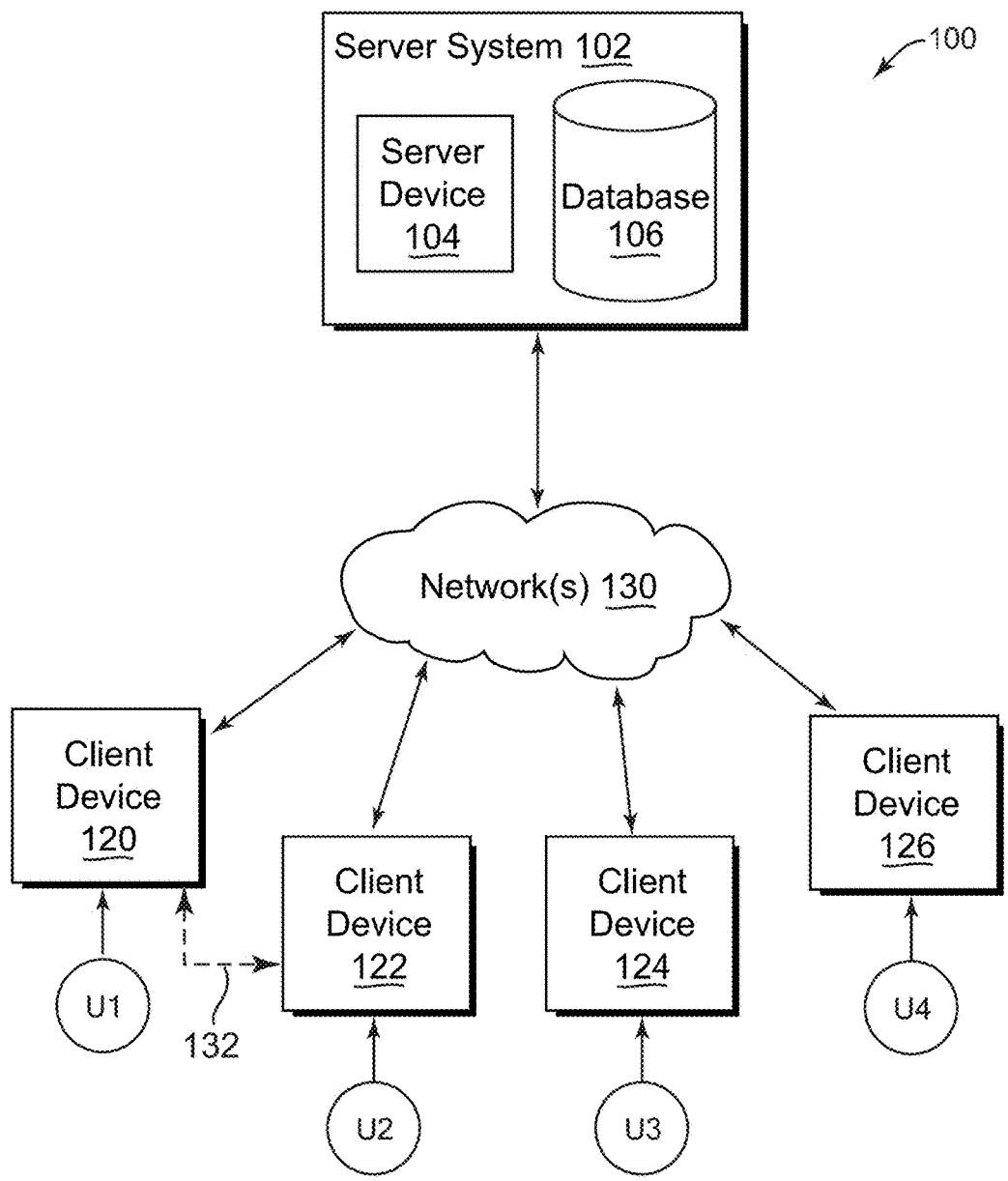
FIG. 1 is a block diagram of an example network environment which may be used for one or more implementations described herein.

One or more implementations described herein relate to providing caller preview data for calls and providing call messages based on caller preview data. In some implementations, a caller device sends a call request to a callee device. After establishing a connection with the callee device (prior to acceptance of the call by the callee device), the caller device transmits at least a portion of caller preview data, such as caller preview video data and/or caller preview audio data, over the connection with the callee device prior to receipt of an acceptance of the call request from the callee device. In some examples, the caller preview data can be live video recorded by a camera of the caller device, live audio captured by a microphone, a stored video or audio segment, etc. The callee device can output caller preview data prior to a callee accepting a call, e.g., as an automatic preview as to who is calling the callee. If at least part of the caller preview data has been transmitted over the connection and the acceptance of the call request has not been received, e.g., for a particular time period since the call request, a timeout of the call request has occurred. In some implementations, the timeout causes a call message to be stored on the at least one callee device, where the call message includes at least a part of the caller preview data. Other conditions can cause the call message to be stored on the at least one callee device.

In some implementations, the caller device can store data of the caller preview data, e.g., frames of a caller preview video, and after a timeout, can terminate the call request with the callee device and transmit the call message to the callee device over the connection to be stored by the callee device. In some implementations, the caller device can, instead of transmitting the call message, transmit a command to the callee device that instructs the callee device to store at least a portion of the previously-transmitted caller preview data as the call message that can be later accessed by the callee. In still further implementations, the caller device can transmit an additional (not yet transmitted) portion (e.g., remaining portion) of the caller preview data to the callee device and instruct the callee device to combine the additional portion with a previously-transmitted portion of the caller preview data to form the call message stored by the callee device. In various implementations, the call message can be a video message and can include frames of the caller preview data (e.g., the call message can have selected frames of the caller preview data, and consist of fewer frames than the entire caller preview data), or can be the entire caller preview data. In some implementations, the call message can be an audio message or other type of message. In some implementations, audio data associated with the caller preview video is not transmitted by the caller device or is disabled until the callee accepts the call request.

In various implementations, the caller device can edit or process the caller preview data before transmitting edited preview data in a call message. For example, the caller device can encode or compress at least a portion of the caller preview data to form the call message, where the encoding causes the call message to be different than the caller preview video transmitted to the at least one callee device. In some examples, a display of one or more user-selectable options can be provided on the caller device, e.g., prior to transmitting the call message. The options can include a first option to use the entire caller preview data (e.g., an entire preview video or audio segment) as the call message, and/or a second option to reject the use of the caller preview data as the call message and to initiate determination (e.g., selecting and/or capturing) a new call message by the caller device. In some implementations, an automatic suggestion can be output on the caller device that requests user input that indicates whether the caller preview data is to be provided as a call message. For example, the automatic suggestion can be provided in response to the caller device determining that particular visual content is included in caller preview data (e.g., particular persons or types of objects as based on user-consented, accessible caller and/or callee preferences), a particular social relationship exists between caller and callee (as determined by user-consented, accessible database or contact list data), etc. The caller device can provide a display of a user interface including one or more controls receptive to input from the caller and configured to play (e.g., review) the caller preview data prior to using the caller preview data in the call message. In some implementations, the caller preview data can be edited before it is transmitted in the call message, e.g., to delete, add, or change selected portions of the caller preview data. For example, an editing user interface can include one or more editing controls receptive to user input, configured to enable user editing of the caller preview video such that an edited caller preview video can be transmitted to the callee device in or as the call message.

In some implementations, the system (e.g., caller device or other system) can perform automatic determinations and/or modifications to the caller preview data to form the call message. For example, one or more particular content features can be verified by the system to exist in the caller preview data to enable the call message to be stored on the callee device, e.g., visual content and/or audio content. In some implementations, one or more content features in the caller preview data can be automatically determined, e.g., by the caller device or other connected system, and the caller preview data can be automatically modified based on the determined features. For example, visual features depicted in a caller preview video can be automatically detected, and the caller preview video can be automatically modified by the system to remove one or more frames from the caller preview video that do not depict the one or more visual features, and/or remove one or more frames that depict particular visual features or particular types of visual features. Similarly, audio features can be automatically detected in caller preview audio data and the audio data can be automatically modified, e.g., to remove portions from the caller audio data that include or do not include particular audio features or types of audio features. Some implementations can detect speech in audio data associated with the caller preview video, obtain text captions corresponding to the speech, and insert particular text captions into respective portions of the caller preview data that are associated with speech corresponding to the text captions. Some implementations can determine a caller context, including referencing one or more preferences of the at least one callee, and, based on the determined caller context, select one data segment of a plurality of data segments to be the caller preview data, and in some cases, a call message can be based on that caller preview data.

Similarly, a callee device can receive a call request from a caller device, establish a connection to the caller device prior to sending an acceptance of the call request, receive caller preview data at the callee device over the connection, cause output of the caller preview data by the callee device, and, in response to the caller preview data being received over the connection for a particular time period without the sending of the acceptance of the call request, cause a call message to be stored in storage of the callee device, where the call message includes at least a part of the caller preview data. In some implementations, an audio output option can be displayed at the callee device to allow user input to enable audio data associated with the received caller preview data to be output by the callee device. The output of the caller preview data by the callee device can include playing caller preview audio data in place of ringtone audio data typically output by the callee device in response to a call request.

One or more features described herein allow caller preview data, such as a caller preview video and/or audio segment, to be automatically (without user intervention) determined and transmitted to callee devices, e.g., to provide a preview of a caller for the callee. In some implementations, if the callee does not accept the call, the caller preview data can be used as the basis for a call message that is sent to and stored by the callee device for later access by the callee. This allows call messages to be sent to a callee without the caller having to record a new call message. For example, if the caller recorded a live video to send to the callee as the preview caller preview video, the caller would not have to create another similar recording as a call message, but instead can select to use the already-recorded caller preview video as at least a portion of the call message. Described features also include providing options to the caller to send caller preview data as a call message or to record a new call message, and options to edit a caller preview data before sending it to the callee in a call message, thus allowing the caller control over the message that is provided to the callee. Various features can also enable a caller to use caller preview data combined with a new recording as a call message, and other features described herein.

Described features can provide automatic selection and transmission of caller preview data prior to a callee's acceptance of a call, and/or selection and transmission of the caller preview data for a call message to a callee device that has not accepted the call. Relevant and interesting caller preview data can be selected and transmitted to a callee without requiring caller intervention, and allow a callee to determine more consistently and reliably whether to accept a call. Described features can allow a device to provide preview caller data to a callee without using the time and device processing resources for the caller user to manually designate appropriate caller data and to designate various call options (filtering, etc.). Described features can allow a device to re-use previously-transmitted preview video and/or audio data to provide a call message without using time and device processing resources to record a new call message. For example, call messages can be provided without a caller having to repeat many of the same actions or speech that were already recorded in previously-transmitted caller preview data. For example, the caller preview data is likely suitable for a call message because the caller has transmitted, and effectively approved, that data for the callee device. Consequently, a technical effect of one or more described implementations is that selection and transmission of caller preview data is reduced in computational time and resources expended to obtain results. Another technical effect of one or more described implementations is that capture, storage, and transmission of call messages is reduced in computational time and resources expended to obtain results. For example, a technical effect of described features is a reduction in the problem of consumption of system processing resources required for display and selection of options related to caller preview data and call messages that may otherwise be used by a system to provide manual options for creating, storing, and/or transmitting caller preview data and call messages. In some implementations, call messages have reduced bandwidth and other data transmission requirements due to having previously transmitted at least some of the message data in preview data. Furthermore, a technical effect of described features is a reduction in the problem of consumption of system processing resources required for a callee device when accepting calls that would not be accepted if relevant preview caller data is first presented. Furthermore, a technical effect of described features is a reduction in the problem of consumption of system processing resources required for a callee device by enabling ease of outputting call messages by a caller device instead of accepting and participating in undesired calls.

In situations in which certain implementations discussed herein may collect or use personal information about users (e.g., user data, information about a user's social network, user's location and time at the location, user's biometric information, user's activities and demographic information), users are provided with one or more opportunities to control whether information is collected, whether the personal information is stored, whether the personal information is used, and how the information is collected about the user, stored and used. That is, the systems and methods discussed herein collect, store and/or use user personal information only upon receiving explicit authorization from the relevant users to do so. For example, a user is provided with control over whether programs or features collect user information about that particular user or other users relevant to the program or feature. Each user for which personal information is to be collected is presented with one or more options to allow control over the information collection relevant to that user, to provide permission or authorization as to whether the information is collected and as to which portions of the information are to be collected. For example, users can be provided with one or more such control options over a communication network. In addition, certain data may be treated in one or more ways before it is stored or used so that personally identifiable information is removed. As one example, a user's identity may be treated so that no personally identifiable information can be determined. As another example, a user's geographic location may be generalized to a larger region so that the user's particular location cannot be determined.

FIG. 1 illustrates a block diagram of an example network environment 100, which may be used in some implementations described herein. In some implementations, network environment 100 includes one or more server systems, e.g., server system 102 in the example of FIG. 1. Server system 102 can communicate with a network 130, for example. Server system 102 can include a server device 104 and a database 106 or other storage device. Network environment 100 also can include one or more client devices, e.g., client devices 120, 122, 124, and 126, which may communicate with each other and/or with server system 102 via network 130. Network 130 can be any type of communication network, including one or more of the Internet, local area networks (LAN), wireless networks, switch or hub connections, etc. In some implementations, network 130 can include peer-to-peer communication 132 between devices, e.g., using peer-to-peer wireless protocols.

For ease of illustration, FIG. 1 shows one block for server system 102, server device 104, and database 106, and shows four blocks for client devices 120, 122, 124, and 126. Server blocks 102, 104, and 106 may represent multiple systems, server devices, and network databases, and the blocks can be provided in different configurations than shown. For example, server system 102 can represent multiple server systems that can communicate with other server systems via the network 130. In some examples, database 106 and/or other storage devices can be provided in server system block(s) that are separate from server device 104 and can communicate with server device 104 and other server systems via network 130. Also, there may be any number of client devices. Each client device can be any type of electronic device, e.g., a desktop computer, laptop computer, portable or mobile device, cell phone, smart phone, tablet computer, television, TV set top box or entertainment device, wearable devices (e.g., display glasses or goggles, wristwatch, headset, armband, jewelry, etc.), personal digital assistant (PDA), media player, game device, etc. Some client devices may also have a local database similar to database 106 or other storage. In other implementations, network environment 100 may not have all of the components shown and/or may have other elements including other types of elements instead of, or in addition to, those described herein.

In various implementations, end-users U1, U2, U3, and U4 may communicate with server system 102 and/or each other using respective client devices 120, 122, 124, and 126.

In some example implementations, users U1, U2, U3, and U4 may interact with each other via applications running on respective client devices and/or server system 102. In some implementations, the interaction may be performed via a network service, e.g., a social network service or other type of network service implemented on server system 102. For example, respective client devices 120, 122, 124, and 126 may communicate data to and from one or more server systems (e.g., system 102). In some implementations, server system 102 may provide appropriate data to the client devices such that each client device can receive communicated content or shared content uploaded to the server system 102 and/or network service. In some examples, the network service can include any system allowing users to perform a variety of communications (e.g., voice or other audio calls, video calls, chat, messaging, etc.), form links and associations, upload and post shared content such as images, video, audio, and other types of content, receive various forms of data, and/or perform socially-related functions. For example, the network service can allow a user to send messages to particular or multiple other users, form social links in the form of associations to other users within the network service, group other users in user lists, friends lists, or other user groups, post or send content including text, images, video sequences, audio sequences or recordings, or other types of content for access by designated users or sets of users of the network service, participate in live video, audio, and/or text chat with other users of the service, etc. Voice calls, video calls, and other communications can be provided using known protocols, e.g., Session Initiation Protocol (SIP) or other VOIP protocols, cell phone networks, Public Switched Phone Network (PTSN), etc., or customized protocols for particular applications. In some implementations, a "user" can include one or more programs or virtual entities, as well as persons that interface with the system or network.

A user interface can enable display of images, video data, and other content as well as communications, privacy settings, notifications, and other data on a client device 120, 122, 124, and 126 (or alternatively on server system 102). Such an interface can be displayed using software on the client device, software on the server device, and/or a combination of client software and server software executing on server device 104, e.g., application software or client software in communication with server system 102. The user interface can be displayed by a display device of a client device or server device, such as a display screen, projector, etc. In some implementations, application programs running on a server system can communicate with a client device to receive user input at the client device and to output data such as visual data, audio data, etc. at the client device.

In some implementations, server system 102 and/or one or more client devices 120-126 can provide one or more communication applications. A communication application may provide one or more communication functions. For example, the functions can include allowing a device to initiate and receive calls with other devices, communicate data with other devices over the network 130, e.g., in chats, voice calls, video calls, etc. The communication application can output related data including communication controls, contact lists, contact identifiers, text and video, etc. The communication application can provide features to create and transmit a call message to other devices, and features to list received and stored call messages that can be accessed by a user. The communication application can provide an associated user interface that is displayed on a display device associated with the server system or client device.

The user interface may provide various functions for the communication application, allowing the user to select and control available functions.

Other implementations of features described herein can use any type of system and/or service. For example, video call services, photo collection services, or other network services (e.g., connected to the Internet) can be used instead of or in addition to a social networking service. Any type of electronic device can make use of features described herein. Some implementations can provide features described herein on client or server devices intermittently connected to computer networks. In some examples, a client device including or connected to a display device can process and display data stored on storage devices local to the client device (e.g., not connected via a communication network) and can provide features and results as described herein that are viewable to a user.

Figure 2A:
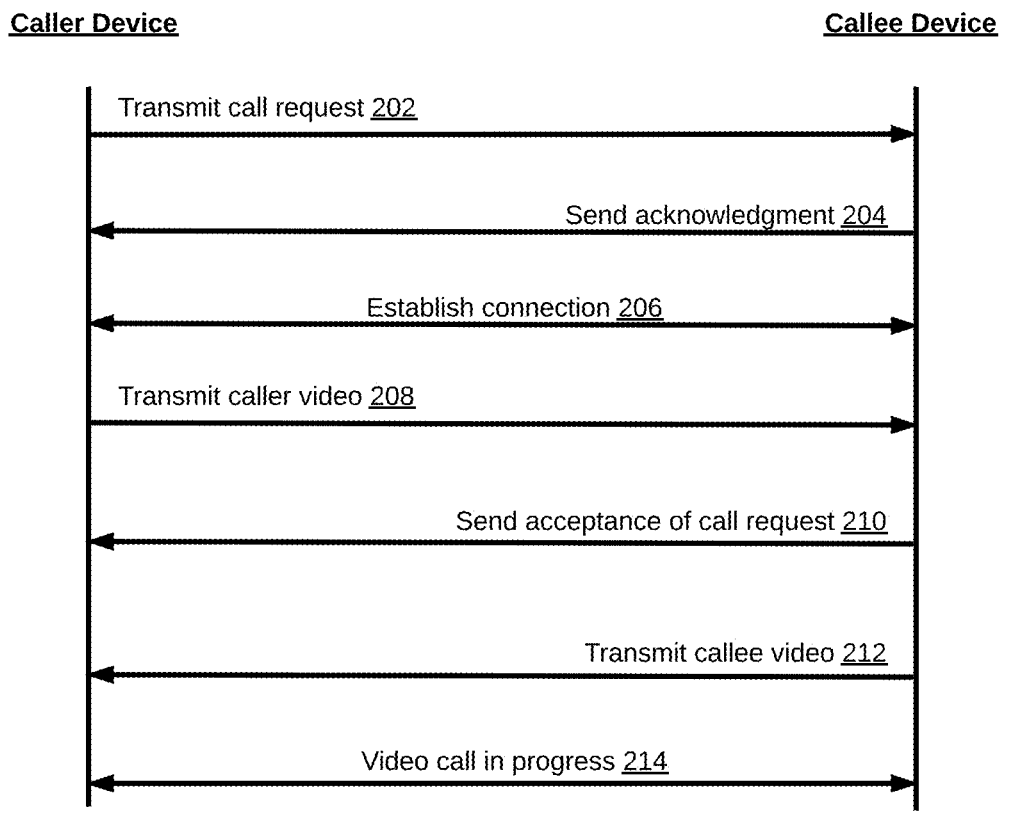
FIGS. 2A and 2B are diagrams illustrating communications between a caller device and a callee device, according to some implementations.

FIG. 2A is a diagram illustrating communications 200 between a caller device and a callee device using one or more features described herein, according to some implementations. For example, the caller device and callee device can be client devices as described with reference to FIG. 1, and/or one or both devices can be server devices in some implementations.

A caller device transmits a call request (202) for a call (e.g., a voice call or video call) over a network to one or more callee devices. In response to the request, the callee device sends an acknowledgment to the caller device (204). In various implementations, the acknowledgment may be transmitted without an explicit user action, e.g., without a callee performing any action. The acknowledgment is transmitted prior to initiation of the call and is not an acceptance of the call. A connection is established (206) via the network. In various implementations, establishment of the connection may follow a protocol that includes a handshake between the caller device and the callee device that sent the acknowledgment. Further, as part of establishment of the connection, the caller device and the callee device may negotiate connection parameters, e.g., a media encoding technique for the connection. For example, the media encoding technique may be selected based on available bandwidth, measured delay, processing capabilities of the caller device and the callee device, etc. After the connection is established, caller preview data for the call may be transmitted (208) from the caller device to the callee device. In this example, the caller preview data is a caller preview video. In various implementations, the caller preview data may be filtered or unfiltered, e.g., the caller preview video may be filtered video or unfiltered video. Various examples of caller preview data that can be transmitted at this stage are described herein.

While the caller preview data transmission is in progress over the connection, a callee device sends an acceptance of the call request (210) to the caller device to initiate the call between caller device and callee device. For example, the callee device sends the acceptance in response to user input. For example, the acceptance can be a signal or data according to the communication protocol that indicates the callee has accepted the call such that the call can be established between the caller device and the callee device. Further, the callee device can transmit callee preview data (e.g., callee video and/or audio data) (212) over the connection. The call starts and remains in progress (214), e.g., until a callee or a caller hangs up, or the connection is broken for some reason, e.g., a loss of connectivity at one or both of the caller device and the callee device.

Figure 2B:
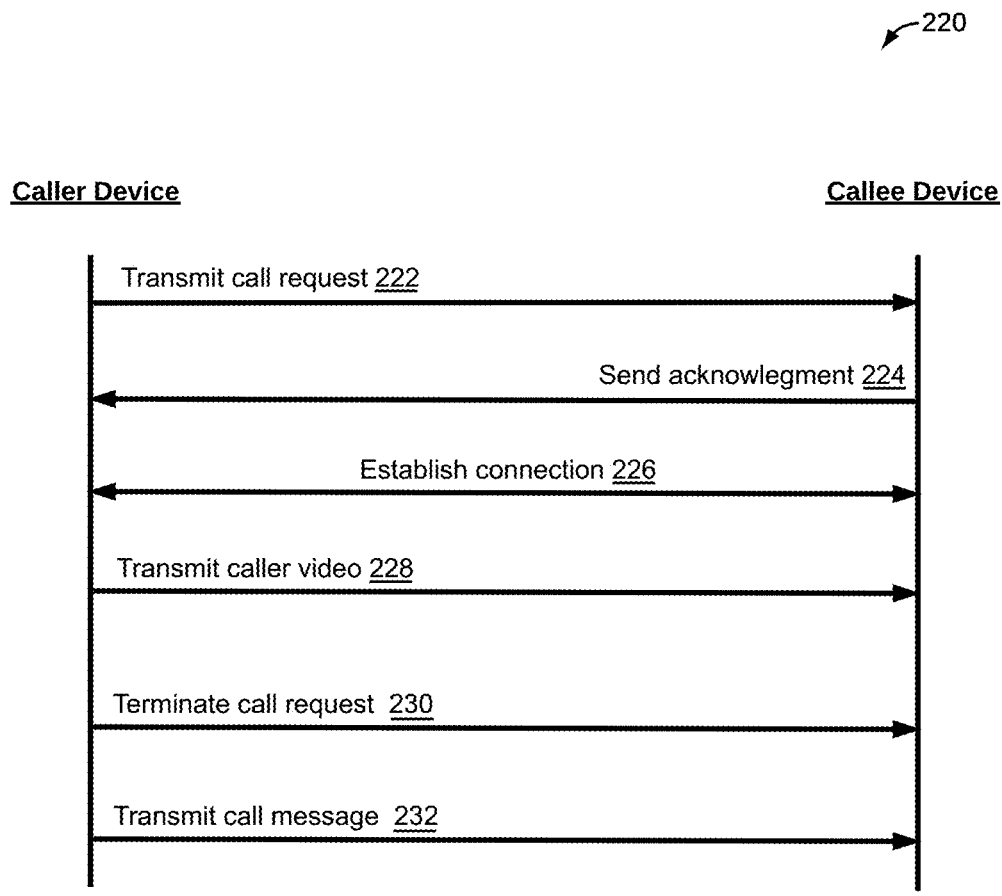

FIG. 2B is a diagram illustrating communications 220 between a caller device and a callee device using one or more features described herein including a call message, according to some implementations. For example, the caller device and callee device can be client devices as described with reference to FIG. 1, and/or one or both devices can be server devices in some implementations.

A caller device transmits a call request (222) for a call (e.g., a voice call or video call) over a network to one or more callee devices. In response to the request, the callee device sends an acknowledgment to the caller device (224). In various implementations, the acknowledgment may be transmitted without an explicit user action, e.g., without a callee performing any action. The acknowledgment is transmitted prior to initiation of the call and is not an acceptance of the call (e.g., where the acceptance can be a signal or data sent by the callee device and received by the caller device according to the communication protocol that indicates the callee device has accepted the call such that the call can be established between the caller device and the callee device). A connection is established (226) via the network. In various implementations, establishment of the connection may follow a protocol that includes a handshake between the caller device and the callee device that sent the acknowledgment. Further, as part of establishment of the connection, the caller device and the callee device may negotiate connection parameters, e.g., a media encoding technique for the connection. For example, the media encoding technique may be selected based on available bandwidth, measured delay, processing capabilities of the caller device and the callee device, etc. After the connection is established, caller preview data may be transmitted (228) from the caller device to the callee device. In this example, the caller preview data is a caller preview video. In various implementations, the caller preview data may be filtered or unfiltered, e.g., the caller preview video may be filtered video or unfiltered video. Various examples of caller preview data that can be transmitted at this stage are described herein.

The caller preview data is transmitted while waiting for an acceptance from the callee device. If a particular amount of time has passed, a timeout occurs, and the call request can be terminated (230). The caller device can then send a call message (232) to the callee device, where the call message can include at least a portion of the caller preview data as in features described herein. The call message can be stored at the callee device or other accessible storage, and may be accessed by the callee.

Figure 3:
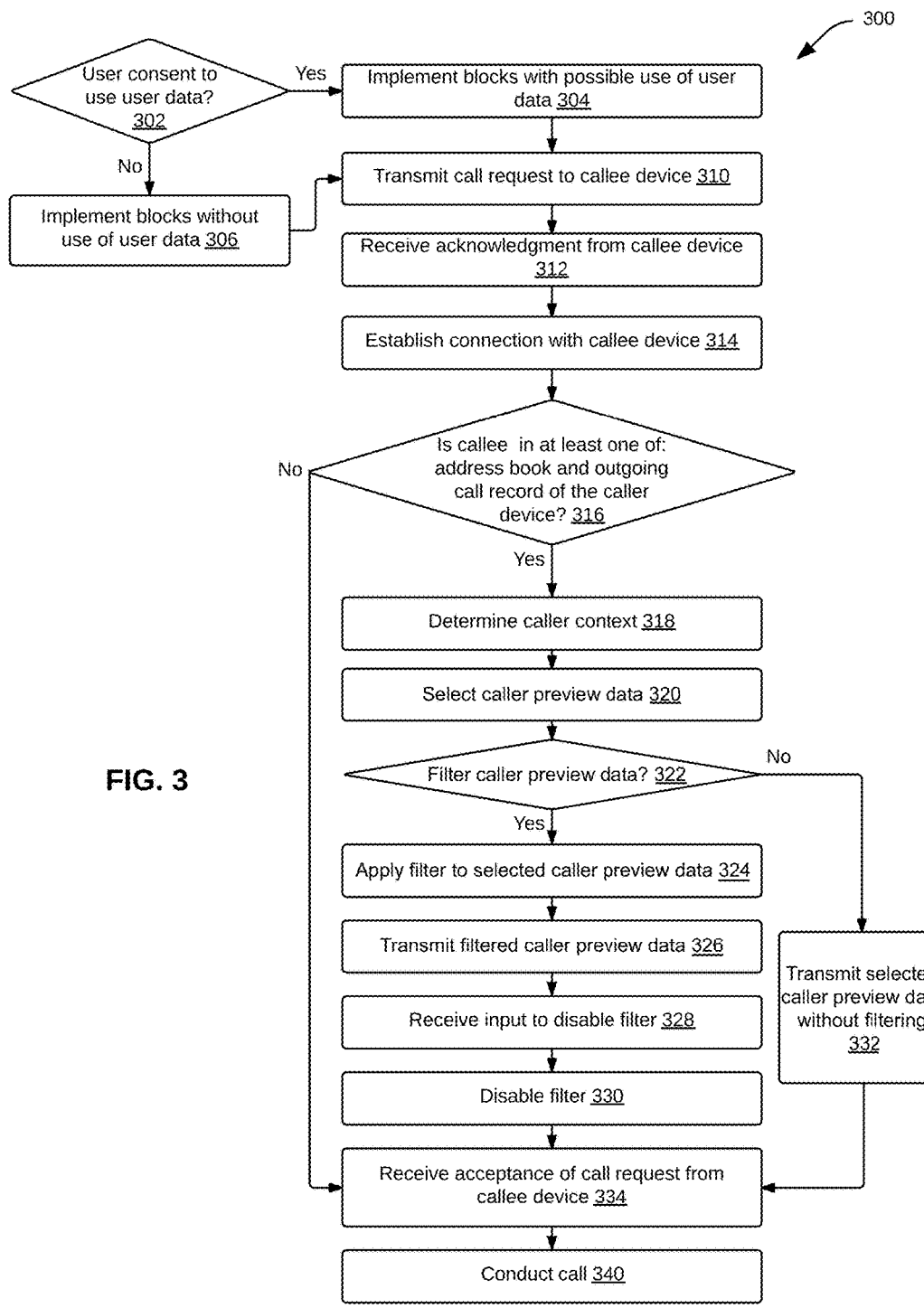
FIG. 3 is a flow diagram illustrating an example method for a caller device, according to some implementations.

FIG. 3 is a flow diagram illustrating an example method 300 for a caller device, according to some implementations. Some or all of the method 300 can be implemented, for example, on a system such as one or more client devices 120, 122, 124, or 126 as shown in FIG. 1. In some implementations, method 300 can be implemented on a server system 102 as shown in FIG. 1, and/or on both a server system and a client system. In described examples, the implementing system includes one or more processors or processing circuitry, and one or more storage devices. In some implementations, different components of one or more clients and/or servers can perform different blocks or other parts of the method 300.

A video as described herein can include multiple digital images ("frames"), each image composed of multiple pixels, for example, having one or more pixel values (e.g., color values, brightness values, etc.). A video can be any collection of images, e.g., a sequence of images, a series of images displayed over time, an animation, a cinemagraph, etc. An image or video as described herein can be stored on one or more storage devices of the implementing system or otherwise accessible to the system, such as a connected storage device, e.g., a local storage device and/or storage device connected over a network. In various implementations, images and videos can be obtained from a variety of sources. For a particular user, images and videos may be obtained from uploads or other transmissions by a user to a server over one or more networks, from an album or other stored collection of multiple images and videos owned or accessible by a user, etc.

In block 302, it is checked whether user consent (e.g., user permission) has been obtained to use user data in the implementation of method 300. For example, user data can include user preferences, user biometric information, user characteristics (identity, name, age, gender, profession, etc.), information about a user's social network and contacts, social and other types of actions and activities, content, ratings, and opinions created or submitted by a user, a user's current location, historical user data, etc. One or more blocks of the methods described herein may use such user data in some implementations. If user consent has been obtained from the relevant users for which user data may be used in the method 300, then in block 304, it is determined that the blocks of the methods herein can be implemented with possible use of user data as described for those blocks, and the method continues to block 310. If user consent has not been obtained, it is determined in block 306 that blocks are to be implemented without use of user data, and the method continues to block 310. In some implementations, if user consent has not been obtained, the remainder of method 300 is not performed.

In block 310, a call request is transmitted from a caller device to one or more callee devices. In this description, a single callee is generally described for explanatory purposes, although multiple callees can be provided. In various implementations, the caller device may be any device that can conduct calls, e.g., video calls. For example, the caller device may be a mobile phone, a computer, a wearable device, etc. In some implementations, a caller user (e.g., "caller") may select a particular entry from an address book that designates the callee user (e.g., "callee"), and the call request is transmitted in response to the selection. In some implementations, a caller may select a particular entry from an outgoing call record that designates the callee, and the call request is transmitted in response to the selection. In some implementations, e.g., when the callee is not in the address book or the outgoing call record of the caller, the callee may input text corresponding to an identifier of the callee, and the caller device can send the call request based on the identified callee.

In various implementations, the caller may select the callee by any of a variety of input techniques. In some examples, the caller may input text corresponding to the callee's name, telephone number etc., e.g., "Abby C.", "404-XXX-YYYY," etc. In another example, the caller may select an entry corresponding to the callee, e.g., an entry that is an item displayed in a displayed user interface selected via a touchscreen, a keyboard, a trackpad, a mouse or other pointing device, etc. In another example, the caller may speak the callee's name, e.g., with a command; for example, "Call Abby." In various implementations, an identifier of the callee may be stored in an entry in an address book (e.g., contact list) of the caller or in an outgoing call record of the caller, e.g., stored on the caller device and/or on available storage of a server or other device over a network. In various implementations, the address book may include a list of contacts that the caller has stored, or a list of contacts that has automatically been saved for the caller, e.g., based on synchronizing the address book with an online service or other information source. In various implementations, the outgoing call record may include a list of identifiers that the caller has previously called, e.g., using the particular caller device or any device that is associated with the caller.

In various implementations, the identifier may correspond to information that uniquely identifies the callee. For example, the identifier may be a telephone number of the callee. In another example, the identifier may be an email address of the callee. In another example, the identifier may be a network service identifier (e.g., social network identifier) corresponding to a network account of the callee used on the network service. In some examples, the identifier may be a login name, a screen name, a user id, etc. of the callee for a particular calling service, e.g., video calling services.

In various implementations, the callee may utilize one or more devices to conduct calls, e.g., video calls. For example, a callee may conduct calls using any device capable of such communication, such as a mobile phone, a computer, a wearable device, etc. In various implementations, the identifier of the callee may be associated with one or more callee devices. For example, a network account of the callee may be associated with her mobile phone, computer, and wearable device, e.g., a social network account or account on another network service. In another example, a telephone number of the callee may be associated with her mobile phone. In various examples, the identifier may be associated with one or more callee devices.

In some implementations, the call request may be transmitted to each callee device that is associated with the identifier. In some implementations, the call request may be transmitted to a subset of callee devices that are associated with the identifier. In some implementations, the call request may be transmitted to a single callee device.

In block 312, an acknowledgment is received from the callee device. For example, the acknowledgment may be received from one or more of the callee devices. In various implementations, the acknowledgment may be a non-acceptance acknowledgement indicating that the one or more callee devices are reachable over a network, but not indicating that the callee has accepted the call request. In various implementations, the acknowledgment may be received from the callee device without any action or input from the callee. For example, the callee device may automatically transmit an acknowledgment back to the caller device before an acceptance of the call is transmitted by the callee device and received by the caller device.

In block 314, a connection is established between the caller device and the callee device from which the acknowledgment is received. For example, the connection may be established over the network. In various implementations, establishing the connection may be carried out via any suitable protocol, e.g., a session initiation protocol (SIP) or other protocol. In some implementations, a media encoding technique, e.g., an audio/video encoding technique may be automatically selected for the connection. For example, the media encoding technique may be selected based on various parameters including, but not limited to, connection bandwidth, delay and packet loss metrics, processor capability of the caller device and the callee device, etc. For example, a media encoding technique for a lower amount of bandwidth on the connection may compress video data and/or audio data to a greater degree than if a higher amount of bandwidth were present on the connection. In some implementations, the connection may be established such that the caller device can transmit media, e.g., video, to the callee device, but the callee device cannot transmit media to the caller device. In some implementations, the connection may be established such that the caller device and the callee device can transmit media to each other via the network.

In block 316, with user consent to use of such data, it is determined whether the callee identifier was previously stored in call-related storage associated with the caller (or caller device), e.g., whether the caller identifier is presently stored in at least one of the address book of the caller and the outgoing call record of the caller. Presence of the callee identifier in the address book may indicate that the caller knows the callee, e.g., the caller is a friend, colleague, acquaintance, business contact, etc. of the caller. In some examples, the caller may have input the callee identifier in the address book, may have accepted the entry of the callee identifier in the address book by another source or process (e.g., by software, device, or automatic process), etc.

Presence of the callee identifier in the outgoing call record may indicate, in some implementations, that the caller previously and recently interacted with the callee, e.g., placed a call to the callee. In various implementations, the outgoing call record may include identifiers that the caller has called in the recent past, e.g., within the previous 24 hours, within the past week, within the past month, within the past year, etc. In these implementations, the period for which the outgoing call record is stored may be user configurable. In some implementations, the outgoing call record may include identifiers for a certain number of recent calls, e.g., last 50 calls, last 500 calls, etc. In these implementations, the particular number of calls stored in the outgoing call record may be user configurable. In some implementations, the outgoing call record may include a history of all prior outgoing calls. In some implementations, no outgoing call record may be maintained such that the outgoing call record is empty, e.g., based on a user preference.

In some implementations, particular portions or sections of call-related storage of the caller can be associated with the use of caller preview data as determined and transmitted in method 300. Other portions of the caller's call-related storage can be unassociated with preview caller data. For example, the caller may designate particular data for use with caller preview data, e.g., address books, portions of address books (e.g., close family members), users indicated in particular date ranges (e.g., who participated in previous calls with the caller), particular users stored in an address book or outgoing call record, or other sections of call-related storage. For example, the caller can perform selections of such data displayed in a user interface using selection features of the user interface. Block 316 can then examine only the designated data to determine if the callee identifier is present, and the undesignated data is not checked. This allows a caller to, for example, designate particular address books, particular sections of outgoing call records, and/or particular users for which preview caller data will be transmitted prior to callee acceptance, and/or designate other address books, outgoing records, and users for which caller preview data will not be transmitted prior to callee acceptance.

In some implementations, if it is determined that the callee is in call-related storage of the caller, e.g., in at least one of the address book of the caller and the outgoing call record of the caller, the method continues to block 318. In some implementations, if it is determined that the callee is not in call-related storage, e.g., in neither of the address book and the outgoing call record, the method continues to block 334, such that no caller preview data is transmitted prior to receipt of the acceptance of the call request.

In block 318, a caller context is determined. In various implementations, the caller context may be determined based on any of multiple factors including a caller device location, a current time at which the call request is transmitted, and/or a variety of other factors. For example, the caller device location may be determined based on a global positioning system (GPS) sensor in the caller device, by signal triangulation of a wireless network that the caller device is coupled to, etc. In various implementations, when the caller user consents to use of user data, the variety of factors indicating caller context can include the caller being accompanied by or being near a friend or a family member and/or being at a particular event (e.g., a birthday celebration, a wedding, a party, a basketball game, a graduation ceremony, etc.), factors being associated with the current location or current time (being located at home, at work, on vacation, at a friend's home, in the morning or late at night, etc.), etc.

In some implementations, when the caller user consents to use of user data, the variety of context factors may include the callee identifier, e.g., the particular callee selected for the video call. For example, with user consent of the callee, the caller device may have access to callee preferences or other previously-stored information indicating types or content of video which this particular callee may prefer to see, and/or other user data of the callee. For example, callee preferences can indicate that the callee prefers caller preview data that portrays the caller (e.g., video that depicts the caller's person and/or audio that outputs the caller's voice) and not caller preview data that are absent the caller (e.g., videos showing scenery or environment of the caller without showing the caller's person, or stock videos). Callee preferences can indicate that the callee prefers to receive caller preview data only at particular times of day or while the callee is located at particular geographic locations (e.g., at home, where the location of the callee is accessible if callee consent has been obtained).

In some implementations, one or more context factors can be determined based on capturing video from one or more cameras of the caller device at the time (or shortly before the time) the context is determined, if user consent has been obtained. For example, if user consent has been obtained, content of the captured video can be analyzed and types of objects detected using image object detection techniques (e.g., to detect faces, monuments, landscapes, objects, etc.). In some implementations, one or more factors can be determined based on user data if user consent has been obtained, e.g., calendar data (e.g., indicating events), activity data, etc. of the caller that is accessible to the caller device.

In block 320, caller preview data is selected for transmission to the callee device. For example, the caller preview data can be a caller preview video that includes video data, e.g., video data and audio data, or video data exclusive of audio data. In some cases or implementations, the caller preview data can be a caller preview audio segment that only includes audio data. For example, caller preview data can include sequential data, such as video data and/or audio data, that is output by a device in a particular sequence (e.g., a sequence of frames and/or audio sounds). In some implementations, caller preview data can include other forms of data, e.g., text, still images, haptic data, etc. In various implementations, the caller preview data may be selected from one or more available data segments, e.g., one or more available videos and/or audio segments (that do not include video data). The videos can include a number of images (e.g., frames) to be displayed sequentially, e.g., at a particular frame rate or duration of display for each frame, or varying frame rates or display durations for frames. The audio segments can include data providing audio output played at a particular playback speed or rate when processed for output by one or more speakers.

In some examples, the available data segments may include videos and/or audio segments (or data feeds) captured live, e.g., at the current time, or at or after the time of the call request. For example, one or more videos can be captured live by one or more cameras of, or in communication with, the caller device. For example, if the caller device is a mobile phone or other mobile device with one front camera and one back camera, the available videos may include videos captured by each of the front camera and the back camera. In another example, the available videos may include videos or images previously captured by the one or more cameras of the caller device and stored on the caller device. In another example, the available videos may include any video (or image, animation, cinemagraph, etc.) stored on the caller device. For example, the available videos can include a plurality of stored images or a video recorded from a previous video call, or a portion (e.g., a motion clip) of a video recorded from a previous call. In some implementations, motion clips formed from portions of video data captured during one or more previous video calls may be used as visual user identifiers or user avatars to represent associated users in user interface displays on the caller device, e.g., in a contact list of users or address book of the caller device. Such motion clips from user identifiers can be available as videos available for selection in block 320.

In another example, if the caller device is coupled to a companion device, e.g., a wearable device such as eyeglasses, smartwatch, wearable camera, etc. that includes a camera, the available videos may include video captured by the companion device. In yet another example, the available videos may include stock videos, e.g., videos associated with the location of the caller device. In some examples, stock videos may be available from the caller's storage and/or public sources on the internet, for example, e.g., websites, network services, map services, etc. Stock videos can be selected which are relevant to the caller context. For example, if the caller device location is at the Grand Canyon, stock videos may include videos of the Grand Canyon. In another example, the available videos may include an application video, e.g., a screen capture video captured from the output of one or more applications currently under execution on the caller device or having previously been executed on the caller device or a different device and stored in available storage.

One or more available data segments can be audio segments captured live by one or more microphones of the caller device and/or microphone(s) of a companion device. In another example, available audio segments may include audio segments previously captured by the caller device and stored on the caller device. In another example, the available audio segments may include any audio segment stored on the caller device, e.g., stored audio segments recorded from one or more previous calls. Available audio segments can include stock audio segments (e.g., music tracks, speeches, etc.).

The caller preview data may be selected based on the caller context. In various implementations, a respective selection score can be determined for one or more of the available data segments, where the selection score for a data segment indicates a respective relevance to the caller context or interest level in the data segment given the caller context. In some implementations, the selection score for a data segment can be a value assigned within a predetermined range of values, based on one or more factors of the caller context. In some examples, various selection scores can be associated with particular context factors. In some implementations, one or more data segments with highest selection scores can be selected. In some implementations, a data segment that has a selection score that does not meet a threshold selection score is not selected.

For example, a caller context factor that can be used in determining a selection score for a data segment can include the geographic location of the caller (obtained with user consent). Particular locations (e.g., provided in a stored list, database, or other association) can indicate a high relevance or interest level for data that are being captured live by the caller at those locations, e.g., locations associated with sightseeing or tourism, vacation locations, locations with well-known sights or monuments, locations at least a particular distance away from the home city of the caller, etc. If the current location of the caller matches any such particular locations, a data segment currently being captured by a caller device or recently captured by a caller device (e.g., within a predetermined time period before the present time of the call) can be assigned a high selection score. In some cases, an available stock data segment that is known to depict the caller's location can be assigned a high selection score, e.g., but a lower selection score than the live captured data segment. In contrast, if the caller's location is known (with user consent) to be a common location often visited by the caller in past (e.g., above a threshold visiting frequency or number of visits within a particular period of time), or locations indoors, etc., then live captured data segments from the caller's device can be assigned a low selection score based on the caller location.

Another caller context factor that can be used to determine a selection score for a data segment includes the current time and/or date. If, for example, the current time indicates that a sunset may be visible at the caller's location, then a data segment being currently captured by the caller's device can be assigned a higher selection score. In contrast, if the current time indicates that it is nighttime, live captured data segments can be assigned a lower selection score. User calendar events (e.g., obtained with user consent) may also indicate whether the caller is at an event and thus whether the caller device's live captured data segments should be assigned a high or low selection score.

Other caller context factors that can be used to determine a selection score for a data segment includes an event at which the caller is participating (e.g., known, with user consent, from the caller's calendar), or whether other persons are with the caller (e.g., known based on user data such as calendar data, or analysis of one or more frames recorded by a camera on the caller's device (with user consent) or audio data recorded by a microphone on the caller's device (with user consent), etc.). For example, such context factors can increase the selection score for a live data segment captured by the caller device due to the caller device being present with such factors. In another example, video frames currently or recently recorded by front and back cameras, and/or audio data currently recorded, can also be examined for suitability. For example, video frames can be examined whether their pixels have below an average threshold luminance level, which may indicate they appear too dark to be used as caller preview data, thus causing a low selection score to be assigned. Other video characteristics of a video can also be examined, e.g., color noise, blurriness, etc. to influence the selection score. Audio characteristics of audio segments can be examined, e.g., to check for audio noise, background sounds being too loud compared to a voice, etc. that may cause a low selection score to be assigned. Stored user preferences of the caller can also be used to influence selection score. For example, the caller may have indicated in user preferences that the back camera of the caller device is preferred for a caller preview video.

In some examples, if the caller is at the Grand Canyon or other sightseeing geographic location, a video captured by the back camera of the caller device at a time of the call, or prior to the call, may automatically be determined to have a high selection score due to the visual scenery located at that location (as known from stored indications of various locations' suitability), while video captured by the front camera may be determined to have a lower selection score than the back camera. In this example, the video captured by the back camera may be selected as the caller preview video, e.g., based on the higher selection score.

In another example, if the caller is at a birthday party event (e.g., known via user data, with user consent, such as user calendar data on the caller device), the front camera may capture the caller's face, and the back camera may capture happenings at the birthday party, e.g., another person blowing on candles or cutting a cake. In this example, the video captured by the front camera and the video captured by the back camera may be assigned an equal selection score to indicate an equal relevance or interest level (unless one or more other factors as described herein are present to indicate to assign a higher selection score to one of these cameras). Further, in some implementations, the equal selection score may be determined if it meets a threshold selection score. If not, the videos are not selected.

In another example, caller context can include one or more spatial orientations in physical space of the caller device. In some examples, the caller can hold the caller device at particular orientations to select a particular context. For example, a caller context of the device being oriented vertically in space (e.g., front and back of device facing approximately parallel to a ground surface, e.g., within an angular threshold range of vertical) can indicate selection of one or more of front and back cameras of the device, while a caller context of the device being held at an angle (e.g., outside a threshold angular range of vertical orientation) or horizontally implies selecting a different video, e.g., a video obtained from an application program currently executing on the caller device, a stored video or audio segment, etc.

In another example, a video and/or audio segment captured from a companion device may be selected based on the video or audio segment having a high selection score. For example, the companion device can be a wearable camera and the caller can be engaged in an activity captured by the wearable camera, such as mountain biking, rock climbing, etc., as indicated by the caller location, movement rate, event or calendar data, or other data. In another example, an application video may be selected as the caller preview video based on the video having a high selection score. For example, the callee identifier may be associated with a customer support official that the caller previously interacted with in a call and the application is associated with the business of the customer support official, such that the video output from the application currently executing on the caller device can be transmitted to the callee as the caller preview video to allow more effective customer support for the application. In some examples, the business of the customer support official can be determined from that official's address used in the previous call. Other application programs having output currently displayed on the caller device can be provided as a caller preview video, e.g., a game program, video playback program, communication program, etc.

Some implementations can determine a total selection score for a data segment based on a combination of multiple individual scores, where each individual score is associated with a caller context factor used in determining the total selection score. In some examples, the multiple individual scores can be summed to obtain the total selection score. For example, a particular video might have a high individual selection score associated with a geographic location of the caller, but may have lower individual selection scores associated with current time and other factors, thus resulting in an average total selection score.

In various examples, when there are multiple available data segments, a particular data segment may be selected as the caller preview data for transmission, where the particular data segment meets a threshold selection score and has a best (e.g., highest) selection score of the available data segments, e.g., indicating a highest relevance or interest level. Some implementations can determine a total selection score for each available data segment as described above, or for a subset of available data segments, and can select the data segment having the best (e.g., highest) total selection score as the caller preview data segment.

In some implementations, multiple data segments may be selected to be transmitted as the caller preview data. For example, multiple selected videos may be combined to generate a caller preview video. In some examples, videos and/or audio segments having an equal selection score can be combined, or a particular number of the videos and/or audio segments having the best selection scores can be combined. In another example, videos and/or audio segments having the best selection scores and having selection scores within a particular threshold score range of each other can be combined. Some implementations can combine videos and/or audio segments from different sources, e.g., one video from a front camera of the caller device and one video from a back camera of the caller device, or one video from a camera on the caller device and one or more other videos from storage on the caller device or from a server, network storage, or other network source. In some examples, two videos can be combined into a combined video that can include the frames of the two videos adjacent to each other within the overall frame of the combined video. Some implementations can crop the individual videos or audio segments as needed, or can display or output one or more of the videos and/or audio segments more prominently (e.g., larger or uncropped, louder, etc.) than one or more other videos and/or audio segments. For example, videos having better selection scores can be displayed more prominently in a combined video. In other examples, multiple selected videos can be combined by overlapping at least a portion of the videos, e.g., one or more videos can be made partially transparent so that all the combined videos can be displayed superimposed in a particular screen area. Multiple selected audio segments can be output fully or partially overlapping in their audio output. Other techniques can be used to combine multiple selected data segments.

While selection of the caller preview data is described with some examples, any individual data segment or combination of data segments may be selected as the caller preview data based on the caller's context.

In some implementations, the caller preview data may be selected based on user input to the caller device that is effective to select the preview data, e.g., from the caller. For example, the caller may provide input to the caller device to select a front camera video as the caller preview video when the caller is wearing a funny hat, or a back camera video as the caller preview video, e.g., when the back camera captures a video of the caller's dog performing tricks. In various implementations, a suitable user interface may be provided on the caller device to enable the caller to select the caller preview data, e.g., the user interface may include user interface elements corresponding to different available data segments (e.g., videos from the front camera, from the back camera, a stock video, etc.), a toggle element that permits the caller to switch between the front camera and the back camera, etc.

In some implementations, selected data (e.g., a stored data segment, a portion of a selected data segment, selected live data from a camera or microphone on the caller device, etc.) can be displayed or output by the caller device before it is transmitted to the callee device as the caller preview data. For example, this display can act as a preview to allow the caller to experience (view or hear) one or more data segments that have been automatically selected to be transmitted to the callee as the caller preview data prior to the callee acceptance of the call. The caller can be provided options of accepting and overriding the selected data, e.g., after experiencing at least a portion of the selected data via the device output. For example, the caller can select a rejection of the selected data (e.g., with one or more displayed user interface controls) and can select one or more other data segments to be used as the caller preview data. In some examples, the caller can select the front camera and/or back camera of the caller device to transmit live video captured by the selected camera(s), and/or the caller can browse and select one or more videos and/or audio segments to transmit from a menu or list of stored videos and/or audio segments accessible to the caller device. In some implementations providing combined data segments that can include multiple data segments, the caller may be provided an option to retain the selected data to be transmitted, and can add one or more user-selected data segments to be combined with the selected data, such that the combined data segment is transmitted as the caller preview data.

In some implementations, e.g., if the caller context is insufficient to indicate suitable caller preview data from the available data segments, or if none of the available data segments meet a threshold selection score, the caller preview data may be selected based on a default setting, e.g., video from a front camera of the caller device.

In block 322, it is determined if the selected caller preview data is to be filtered. In some implementations, the caller preview data may be filtered, if the caller indicates a preference to filter outgoing caller preview data. In some implementations, for example, the caller preview data may be filtered based on content of the caller preview data. In some implementations, e.g., when the acknowledgment from the callee device includes a preference for filtered data, the caller preview data may be filtered. If it is determined that the caller preview data is to be filtered, the method continues to block 324. If it is determined that the caller preview data is not to be filtered, the method continues to block 322.

In block 324, one or more filters are applied to the selected caller preview data. For example, a video filter (or visual filter) may modify a caller preview video such that content of the video is blurred. For example, application of the video filter may result in a filtered video that has a reduced number of sharp edges or boundaries, or in which shapes of objects are discernible but not specific identities of objects. In some implementations, the video filter may apply a hexagon mosaic to the caller preview video. Application of the hexagon filter (or similar type of filter) may cause pixels of the video to be updated to values such that a hexagon pattern is seen in each frame of the filtered video, and details such as shapes of objects in the caller preview video are obfuscated. In various implementations, the video filter may be applied, e.g., to obfuscate identifiable information such as a face, a place, an object. In these implementations, the video filter may however provide indication of the contents of the caller preview video, e.g., by retaining outlines of faces/objects, by retaining color distribution of pixels, etc. For example, if the caller preview video includes a giant sequoia tree, the filtered video may include sufficient detail to indicate that the caller preview video has a tree, but not enough detail to determine that it is a giant sequoia tree. Some implementations can retain clarity of a background depicted behind foreground objects. FIG. 5B shows an example of a blurred caller preview video.

In some implementations, an audio filter can be applied to the selected caller preview data. For example, caller preview data that is video data may include audio data that corresponds to the video data. Such audio data can be filtered out such that the caller preview video data will not include the corresponding audio output.

In some implementations, other forms of processing (e.g., besides filtering) can be automatically performed on the caller preview data by the system (e.g., by the caller device and/or other connected system) before or during transmission. For example, text can be automatically generated based on caller preview data and included in caller preview data or replace one or more portions of the caller preview data. Similarly as described below with respect to call messages in FIGS. 6 and 7, the processing can include detecting one or more visual features in video data or image data of the caller preview data, detecting one or more audio features (e.g., speech) in audio data of the caller preview data, etc., and automatically generating text based on the detected features. For example, text captions can be generated based on speech audio data and added to the caller preview data (or replace portions of caller preview data). Text descriptions can be generated based on detected visual features in video data. Text messages can be generated based on such detected features, and used as or added to the caller preview data. In additional examples, processing can include encoding, compression, etc. of the caller preview data similarly as described in other portions of the description herein. Such processing can, for example, be performed based on stored caller preferences and/or stored callee preferences. In some implementations, processing can include adding data to the caller preview data, e.g., based on caller input to the caller device. For example, the caller can be inputting text to, and/or drawing lines or shapes on a screen of, the caller device while a captured video stream is capturing video of the caller, and the caller preview data is processed by the system to include both the captured video stream and data capturing the caller input to the caller device.

In block 326, the filtered caller preview data may be transmitted to the callee device from which the acknowledgment was received. The caller preview data may be transmitted over the connection established with the callee device, e.g., using the media encoding technique selected for the connection. In some implementations, filtered preview video data may omit audio data from the transmission such that the callee device will not output audio associated with the video data. In some implementations, audio data can be transmitted in visually-filtered video data. In some implementations, if the transmitted preview data has a defined end or termination (e.g., a stock video or audio segment, or other video or audio segment captured or stored at a previous time having a defined termination point) and the end of the preview data is transmitted, the preview data can be looped one or more additional times, e.g., such that the preview data is transmitted again from its start (e.g., until the call request is accepted by the callee or the call is terminated before acceptance). In some implementations, caller preview data with a defined end can be transmitted once, or a particular number of times, and then the preview data is not transmitted further. In some implementations, one or more different default data segments can be transmitted (e.g., in looped manner or not) after the selected caller preview data has reached its end, and/or the one or more successive data segments can be selected randomly from available data segments, or can be selected from available data segments using one or more scores and/or context factors as described herein (e.g., the next highest scoring data segment after the highest scoring data segment was transmitted).

In block 328, input to disable one or more of the applied filters may be received. In some implementations, the input to disable the filters may be received from the caller. For example, the caller may select an option to disable a video filter from a user interface on the caller device, e.g., by touching the option on a touchscreen, by selecting the option with a pointing device such as a mouse, etc. In another example, the caller may disable one or more filters by one or more voice commands.

In some implementations, the input to disable one or more filters may be received from the callee device. In the implementations where the input to disable the filters is received as an indication from the callee device, such indication is received prior to an acceptance of the call request by the callee. The indication can indicate to disable the filters, and/or in some implementations, the indication can indicate other information. For example, the indication can indicate that the callee device has detected a face and the indication can also indicate to disable a video filter. In some implementations, only the indication is received that the callee device has detected a face, and the caller device can consider this an indication to disable the video filter, e.g., based on known preferences of the callee, default settings, etc. Other actions or states detected by the callee device that can be used to indicate to disable filters are described below with reference to FIG. 4.

In block 330, one or more filters are disabled, e.g., based on the received input of block 328. In some examples, one or more video filters may be disabled such that caller preview video data is transmitted to the callee device without blurring or other modifications. An audio filter can be disabled such that caller preview video data is transmitted with audio data, or such that audio-only caller preview data is enabled to be transmitted.

In block 334, acceptance of the call request may be received from the callee device over the established connection. For example, the acceptance can be a standard signal or data according to the call communication protocol being used that indicates the callee has accepted the call and that a call communication can now be established between the caller device and the callee device. In some examples, the acceptance may be received in response to the callee providing input to answer the call, e.g., by selecting an option to answer the call that is displayed on a screen of the callee device, by a voice command, etc. Based on the callee providing the input to answer the call, the acceptance of the call request may be transmitted by the callee device to the caller device. The acceptance of the call request may be received after at least a portion of the preview data segment is transmitted to the callee device. For example, if the preview data segment is a stored video or audio segment having a defined length, at least a portion of this video or audio segment was transmitted prior to receiving the acceptance of the call.

In block 340, the call is established and conducted such that the caller and the callee may engage in the call over the connection. In various implementations, the caller preview data transmitted prior to acceptance may or may not need to be changed to a different data feed (e.g., live data feed of video and/or audio data) transmitted from the caller during the call. For example, in some cases, e.g., if the caller preview data transmitted prior to callee acceptance included live video data of the caller captured by a camera of the caller device, then the source and content of the preview video data need not be changed upon receipt of the acceptance of the call request (e.g., unless the video call was filtered, as described below), and in some examples, the preview video data can continue to be transmitted during the established video call similarly as it was transmitted prior to the callee acceptance. In some cases, e.g., if the preview data transmitted prior to callee acceptance is a live video not showing the caller (e.g., captured by a rear camera of the caller device) or is data previously-captured or -recorded, then the transmitted data can be changed after receipt of acceptance of the call request to a live data feed, e.g., depicting or portraying the caller, e.g., being captured by a front camera of the callee device or other camera, or by a microphone of the callee device.

In some implementations, upon receipt of acceptance of the call request by the callee, audio transmission from the caller device that may have been previously disabled may be enabled, such that the callee device can output received audio data. In some implementations, e.g., when the caller preview video is filtered and input to disable the filter was not previously received, the filter may be disabled in response to receipt of the acceptance of the call request. Further, in some implementations, upon receipt of acceptance of the call request by the callee, audio and/or video transmission from the callee device may be enabled. In some cases or implementations, the connection may be updated to enable transmission of media (e.g., audio/video) from the callee device to the caller device. The caller device may output callee audio and display callee video received from the callee device.

If it is determined in block 322 that the caller preview data is not to be filtered, the block 332 may be performed. In block 332, the selected caller preview data may be transmitted without filtering, e.g., without any modification.

Figure 4:
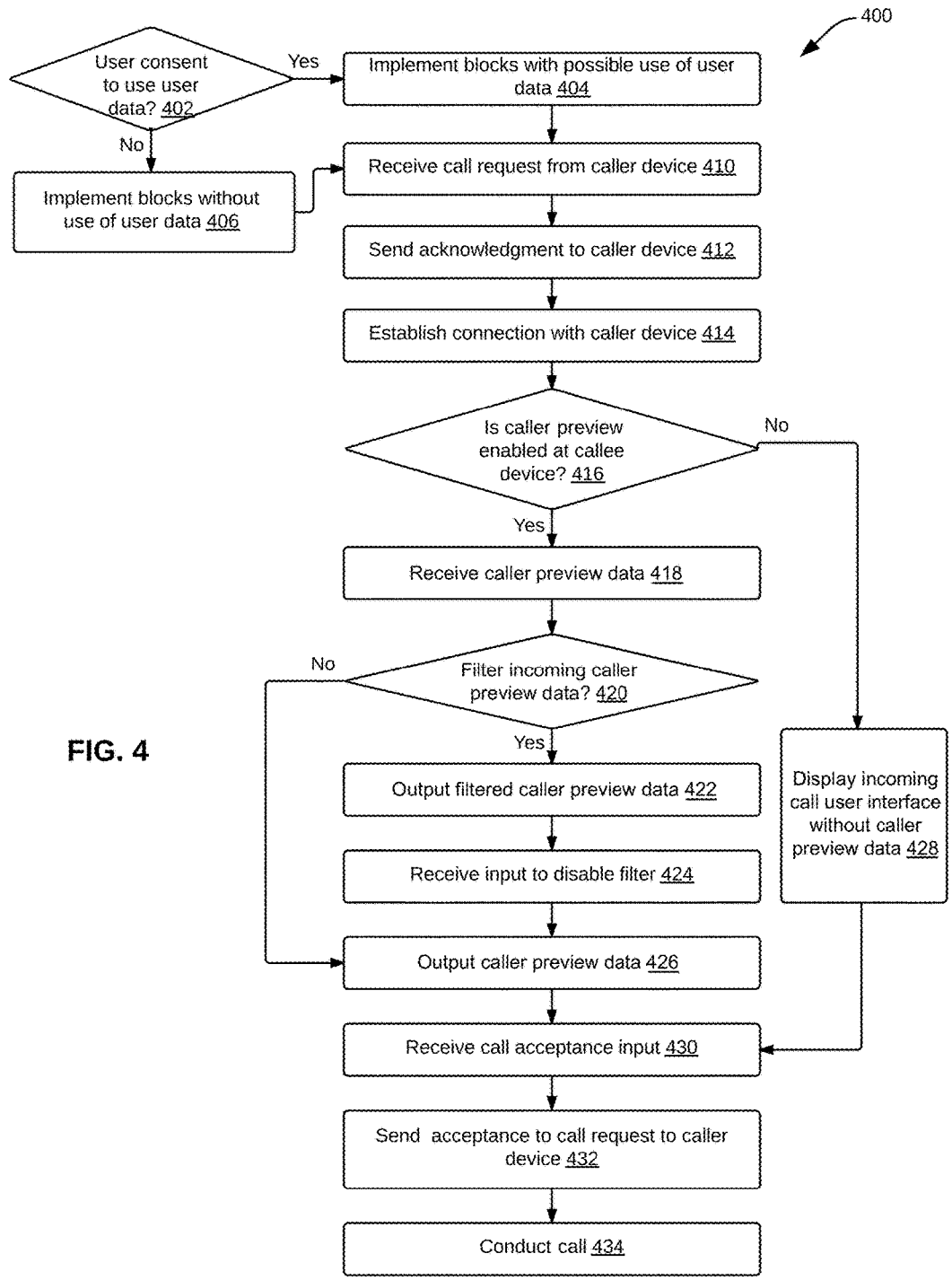
FIG. 4 is a flow diagram illustrating an example method for a callee device, according to some implementations.

FIG. 4 is a flow diagram illustrating an example method 400 for a callee device, according to some implementations. Some or all of the method 400 can be implemented, for example, on a system such as one or more client devices 120, 122, 124, or 126 as shown in FIG. 1. In some implementations, method 400 can be implemented on a server system 102 as shown in FIG. 1, and/or on both a server system and a client system. In described examples, the implementing system includes one or more processors or processing circuitry, and one or more storage devices. In some implementations, different components of one or more clients and/or servers can perform different blocks or other parts of the method 400.

In block 402, it is checked whether user consent (e.g., user permission) has been obtained to use user data in the implementation of method 400. For example, user data can include user preferences, user biometric information, user characteristics (identity, name, age, gender, profession, etc.), information about a user's social network and contacts, social and other types of actions and activities, content, ratings, and opinions created or submitted by a user, a user's current location, historical user data, etc. One or more blocks of the methods described herein may use such user data in some implementations. If user consent has been obtained from the relevant users for which user data may be used in the method 400, then in block 404, it is determined that the blocks of the methods herein can be implemented with possible use of user data as described for those blocks, and the method continues to block 410. If user consent has not been obtained, it is determined in block 406 that blocks are to be implemented without use of user data, and the method continues to block 410. In some implementations, if user consent has not been obtained, the remainder of method 400 is not performed.

In block 410, a call request is received at a callee device, where the call request originated from a caller device. In block 412, an acknowledgment is sent to the caller device. In various implementations, the acknowledgment is sent automatically, without user input. The acknowledgment may indicate, for example, that the callee device is reachable via the network.

In some implementations, the acknowledgment may further include a preference for filtered data (e.g., filtered video), as described above. The preference for filtered data or for unfiltered data may be automatically determined by the callee device based on a variety of factors. For example, when the callee consents to use of user data, the callee device may determine that it (and the callee) are in a public location, such as a store, train station, etc., (based on sensed location data) and determines that there is a preference for filtered data. In another example, if the callee consents to use of user data, the callee device may determine that the callee is in a meeting (e.g., a business meeting at the callee's work location, based on location data and/or user calendar data or other user data) and determine that there is a preference for filtered data. In another example, the callee device may determine that it is placed approximately flat, e.g., on a table, with the callee device screen facing up (e.g., based on one or more motion sensors of the callee device), and determine that there is a preference for filtered data, e.g., since the callee device screen is visible. In another example, when the callee consents to use of user data, the callee device may determine that the callee is at home and that the callee device is unlocked (e.g., it is accessible for use, or is currently being used by the callee), and determine that there is a preference for unfiltered preview data. A combination of location, callee's calendar, phone orientation, and other factors may be used to determine the preference for filtered data or data that is not filtered.

In block 414, a connection is established with the caller device. The connection may be established as described with reference to block 314 of FIG. 3.

In block 416, it is determined whether receiving and/or outputting caller preview data is enabled at the callee device. For example, a callee may select an option such that caller preview data is disabled, e.g., in call settings or preferences that apply to all callers, or specific callers. In another example, caller video preview may be disabled, e.g., when available bandwidth over the connection is not sufficient for caller video preview, if the connection is a metered connection, etc. If it is determined that caller preview data is enabled at the callee device, the method continues to block

418. If it is determined that caller preview data is disabled at the callee device, the method continues to block 428.

In block 418, caller preview data is received over the established connection. In various implementations, the caller preview data may be received using a media encoding technique identified for the connection, e.g., similarly as described above with reference to FIG. 3.

In block 420, it is determined whether the incoming caller preview data is to be filtered in its output by the callee device. In some implementations, it may be determined whether the incoming preview data has been filtered previously, e.g., by the caller device as described with reference to FIG. 3. In some implementations, determination of whether incoming preview data is already filtered may be performed by analyzing the incoming preview data, e.g., to determine whether the incoming data is blurred, does not include audio data, and/or is filtered in other ways. In some implementations, determination of whether incoming caller preview data is already filtered may be based on a parameter transmitted by the caller device and associated with the preview data, indicating the filtered status of the preview data. Further, it may be determined whether and/or how to filter the caller preview data based on stored preferences of the callee, e.g., based on one or more filter settings stored on the callee device. For example, the callee device can display filter and output options in a user interface, and the callee can select one or more options (e.g., via touchscreen, voice commands, etc.). In some implementations, options can be displayed by the callee device, receptive to callee input, to allow a callee to select filter and/or output preferences and/or settings. For example, the options can be displayed after receiving the call request in block 410 and before outputting the caller preview data. Some implementations can provide the options at any time, e.g., prior to call requests.

In some implementations, callee filter preferences or settings can include audio data filter and/or output settings. For example, one setting can be to automatically output, by the caller device, audio data in received caller preview data (e.g., in place of a ringtone in some implementations). Another setting can be to automatically mute audio output in received caller preview data and to display text corresponding to speech in the audio data (e.g., transcribe the audio speech to displayed text). Another setting can cause an option to be displayed by the callee device, after the call request has been received and before the call request has been accepted, that allows the callee to select whether or not to output audio data in the caller preview data by the callee device. For example, video data of the caller preview data can be displayed by the callee device and the option can be provided during that display. These settings can be provided to operate on audio data that is included with video data in the caller preview data, and/or to operate on audio data that does not accompany video data in the caller preview data.

If it is determined that the incoming caller preview data is not filtered and that the callee has a preference to filter the caller preview data, it may be determined that the caller preview data is to be filtered by the callee device. If it is determined that the incoming caller preview data is to be filtered for its output, the method continues to block 422. If it is determined that the incoming caller preview data is not to be filtered for its output, the method continues to block 426.

In block 422, filtered caller preview data is output by the callee device. For example, if the caller preview data includes video data, the video data is displayed, e.g., on a screen of the callee device. If it is determined in block 420 that the incoming caller preview data is not already visually filtered and that the callee device is to visually filter the caller preview data, the incoming preview video data may be visually filtered by the callee device prior to displaying on the screen (or outputting via speakers) of the callee device. For example, the callee device may filter incoming preview video data by applying one or more video filters, as described previously with reference to block 324 of FIG. 3.

If audio data is included with the video data, then if the audio data is not filtered and the callee device is to provide audio filtering, the incoming preview caller audio data can be filtered, e.g., by the callee device muting audio output that is caused by the preview caller audio data. If the callee device is not to provide audio filtering, the audio data can be output in correspondence with the display of the video data. In some implementations, the caller preview audio data is output instead of a ringtone or other audio data similarly as described below. In some implementations, the audio data is not output unless user input from the callee has selected an option to output the audio data.

If the caller preview data is audio data and does not include video data, then the audio data is output by the callee device if audio output is not to be filtered by the callee device. In some implementations, the caller preview audio data is output instead of a ringtone or other audio data that is the default output by the callee device in response to receiving a call request. In some implementations, the caller preview audio data can be combined with such a default ringtone. For example, the default ringtone volume can be reduced, e.g., to be background audio while the caller preview audio data is output as louder foreground audio. Displayed options and/or callee preferences can cause caller preview audio data and/or a ringtone to be output under specified conditions. In some examples, the ringtone may be output as a default unless the caller sending caller preview data has a social relationship with the callee as determined in an accessible database, e.g., is in the callee's contact list on the callee device, is in a user group associated with the callee in a social networking service, etc.

In some implementations, the system (e.g., callee device and/or another system in communication with the callee device, such as a server system or other client device) can detect speech in caller preview audio data. The system can obtain or generate text corresponding to detected speech present in the audio data, e.g., while muting audio output, similarly as described above for the caller device. In some implementations, the text can be determined or generated by the system and the generated text is received by the callee device with the other caller preview data. For example, the generated text can be displayed on a screen of the callee device in timed correspondence with the speech as the speech is output (or would be output if the speech is not muted). For example, if video data is also received, the generated text can be displayed on top of or to the side of displayed video frames. If only audio data and no video data is received, the generated text can be displayed in a user interface or other message display area of the callee device display screen. In some implementations, the generated text can be displayed at a different rate or timing than the timing of the speech. In some examples, the generated text can be displayed while or after the audio data and/or a ringtone of the callee device is output as audio from the callee device. In some implementations, the generated text can be displayed by the callee device as one or more individual text messages, e.g., displayed in a text message interface or chat interface provided by the callee device.

In some implementations, if user consent has been obtained, the callee device (or other system) can also or alternatively generate text (e.g., text descriptions) of visual features depicted in received video data or image data of the caller preview data and display the generated text during, before, or after display of the video or image data. For example, if user consent has been obtained, the visual features are detected in received video data or image data of the caller preview data and can include persons (unidentified), objects, landscape features, etc., similarly as described elsewhere herein. In some implementations, all or some of generated text (based on audio and/or video/image data) may have been generated by the caller device or other system, and is included in the received caller preview data.

In block 424, input may be received to disable one or more of the filters in some cases or implementations. In various implementations, such input may include, e.g., a command from the callee or an action performed by the callee. For example, the callee device may receive the command from the callee as a touch input on a touchscreen display, a voice command, etc. For example, the action performed by the callee may include picking up the callee device from a stationary state, where the picking up can be detected by the callee device based on one or more motion sensors of the callee device (e.g., accelerometers and/or gyroscopes). In another example, the action performed by the callee can include unlocking the callee device, e.g., selecting one or more controls of the callee device to unlock one or more callee device functions. In another example, the action performed by the callee can include the callee glancing at the callee device. For example, if the callee user has consented to use of user data, the input to disable the filter may include the callee device detecting a face. For example, the face may be detected by analyzing video from a camera of the callee device, such as a front camera of the callee device. In some implementations, face detection can be performed if the callee device senses it is being picked up. The callee device can identify the callee in other ways in some implementations with callee consent, e.g., a fingerprint scanner. In the implementations where the incoming caller preview data is already filtered, in response to the input to disable the filter received at block 424, the callee device may transmit an indication to the caller device to disable its use of one or more filters to filter the incoming caller preview data. In the implementations where the incoming caller preview data is not already filtered, and a filter is applied by the callee device, the filter at the callee device may be disabled in response to the input received at block 424.

In block 426, the incoming caller preview data is output. For example, if the caller preview data includes video data, the video data is displayed, e.g., on a screen of the callee device. The caller preview data may be displayed without video filtering, e.g., if video filtering was not applied or was disabled in block 424. In some implementations, a specialized user interface is displayed to indicate that the incoming data is caller preview data that is being received prior to a call being established. For example, a smaller video window can be displayed by the callee device to display a caller preview video as compared to a larger video window used for an established call, and/or one or more other visual and/or audio indicators of the caller preview data can be displayed in a user interface and/or otherwise output by the callee device.

If audio data is included with the video data, then the audio data can be output in correspondence with the display of the video data (e.g., if audio filtering is not applied). In some implementations, the caller preview audio data is output instead of a ringtone or other audio data similarly as described below. In some implementations, the audio data is not output unless user input from the callee has selected an option to output the audio data. If the caller preview data is audio data and does not include video data, then the audio data is output by the callee device (e.g., if audio filtering is not applied). In some implementations, the caller preview audio data is output instead of a ringtone or other audio data that is the default output by the callee device in response to receiving a call request. In some implementations, the caller preview audio data can be combined with such a default ringtone. For example, the default ringtone volume can be reduced, e.g., to be background audio while the caller preview audio data is louder foreground audio. In some implementations, the system can display generated text corresponding to detected speech present in the audio data and/or visual features present in video or image data, similarly as described above for block 422.

In some implementations, the callee device can output caller input data included in the callee data, e.g., audio, text, or graphical (e.g., pixel drawings) input data provided by the caller. Such caller input data can be coordinated in its display with other associated caller preview data. For example, if the caller preview data includes caller input data such as speech, text, or graphical data input by the caller during the capture of particular frames of video data of the caller preview data, then that audio, text or graphical data can be output by the callee device when the corresponding frames of the video data are displayed.

In block 430, call acceptance input is received at the callee device from the callee. For example, the acceptance input may include the callee providing input to answer the call, e.g., by selecting an option to answer the call that is displayed on a screen of the callee device, by a voice command, etc.

In block 432, the acceptance of the call request may be transmitted by the callee device to the caller device over the network. In block 434, the call is established and conducted, e.g., as described with reference to block 340 of FIG. 3. In some implementations, filtering of the caller preview data, if provided and not disabled prior to this block, can be disabled upon callee acceptance of the call. Some implementations can continue to filter the caller preview data after call acceptance, e.g., based on caller and/or callee preferences.

If it is determined in block 416 that caller preview data is not enabled at the callee device, block 428 may be performed. In block 428, a user interface for incoming calls is displayed by the callee device without the caller preview data. For example, the incoming call user interface may include user interface elements for the incoming call, e.g., as illustrated in FIG. 5A, but exclude the caller preview data.

FIGS. 5A-5F are diagrammatic illustrations of example representations of a user interface showing one or more features described herein, according to some implementations. FIGS. 5A-5F each show an example user interface displayed on a callee device. Some reference numerals are omitted from FIGS. 5A-5F for simplicity.

Figure 5A:
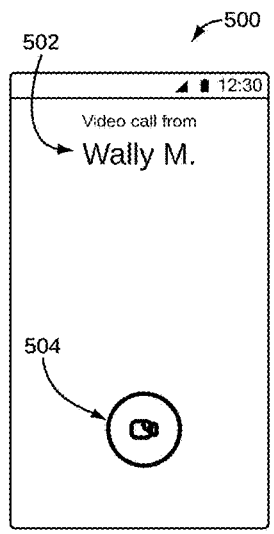
FIG. 5A-5F are diagrammatic illustrations of example representations of a user interface showing one or more features described herein, according to some implementations.
Figure 5B:
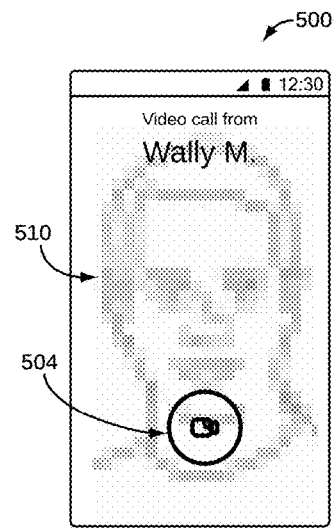

In FIG. 5A, a first user interface 500 is illustrated. As illustrated in FIG. 5A, a notification of an incoming video call request from a caller "Wally M." is displayed in the user interface 500. The notification includes an indication 502 (or identification) of a user that is calling, which in this case is a text indication. The notification also includes a user interface element 504 that is selectable by a callee to answer the call, e.g., via a touchscreen, voice command, or other input device. In the example illustrated in FIG. 5A, the acknowledgment has not yet been received by the caller device, and no caller preview video is displayed.

In FIG. 5B, user interface 500 is shown at another stage of the video call. In the example illustrated in FIG. 5B, the acknowledgment from the callee device has been received by the caller device, and accordingly, the caller device selects and transmits a caller preview video that is received by the callee device displaying interface 500. In the example illustrated in FIG. 5B, the selected data for the caller preview data is the live video being captured by the front camera on the caller device, which captures the face of the caller. In another example, the selected data can be the live video being captured by the back camera of the caller device, which captures the face of a person located in the view of the back camera. In still another example, the selected data can be a pre-stored or pre-recorded video that is provided from storage accessible to the caller device. In still another example, the selected data can be live audio data being recorded by a microphone of the caller device, or can be a pre-stored or pre-recorded audio segment stored in storage accessible to the caller device.

In this example, one or more video filters are enabled (e.g., at the caller device and/or at the callee device), and accordingly, a filtered caller preview video 510 is displayed such that a blurred face is shown, indicated by a blurred outline in FIG. 5B. Further, user interface elements such as the user interface element 504 and the text indication 502 "Video call from Wally M." are overlaid on top of the filtered caller preview video.

Figure 5C:
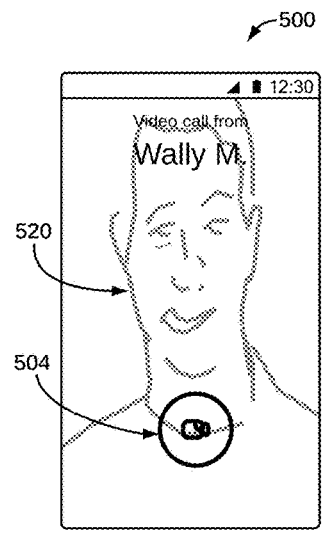

FIG. 5C shows another example of user interface 500. In this example, the video filter has been disabled, e.g., in response to input to disable the filter as discussed above with reference to FIGS. 3 and 4. As illustrated in FIG. 5C, caller preview video 520 is displayed without filtering such that it clearly shows a face that may be recognizable by the callee, e.g., the face of the caller. Further, user interface elements such as the user interface element 504 and the text indication 502 "Video call from Wally M." are overlaid on top of the caller preview video.

Figure 5D:
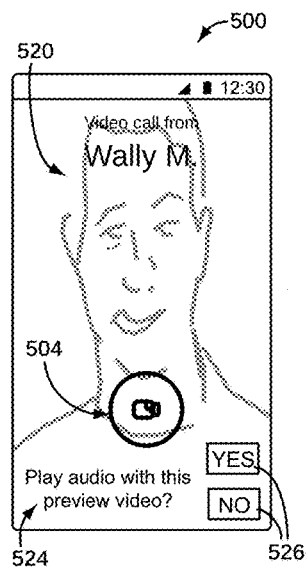

FIG. 5D shows another example of user interface 500. In this example, an audio option message 524 is displayed in the user interface 500. The audio option message 524 provides an option to the callee to select whether or not audio data is to be output, where the audio data accompanies and corresponds to the video data of the caller preview data. For example, the callee can select one of the options 526 to enable or continue disabling the audio output. In this example, the audio option message 524 and options 526 are displayed after the video data of the caller preview video 520 has already started being displayed. In some implementations, callee preferences can determine whether audio data in caller preview data is output and/or whether speech in the audio data is automatically transcribed to text, e.g., by the callee device or other device, and displayed in user interface 500.

Figure 5E:
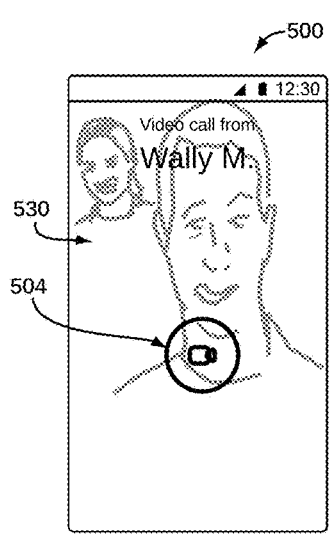

FIG. 5E shows another example of user interface 500. In this example, the user interface element 504 is shown displaced by a particular distance from its original position shown in FIGS. 5A-5D. In some implementations, the user interface element 504 may be displaced in response to input, e.g., touch input from the callee. In this example, the shown displacement of the user interface element 504 by the callee indicates that the callee is accepting the video call. Other implementations can allow the callee to accept the call in other ways, e.g., selecting, tapping, or clicking the user interface element 504, inputting a voice command, inputting a motion command by moving the callee device in a pre-configured manner as detected by motion sensors of the callee device, etc. Further, FIG. 5E illustrates an updated caller preview video 530, that shows a second face, e.g., of a second person that has entered the caller preview video.

Figure 5F:
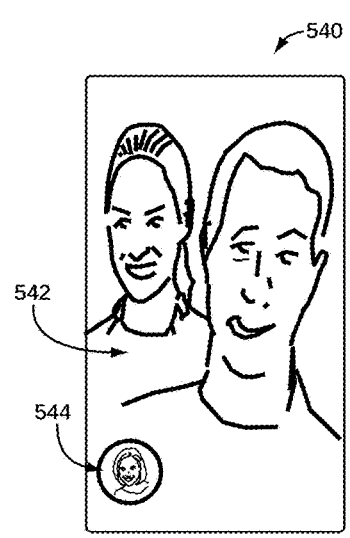

In FIG. 5F, a user interface 540 illustrated. In this example, the user interface 540 is a video call interface, where the video call is established and in progress after the acceptance of the video call by the callee as shown in FIG. 5E. In the example of FIG. 5F, the user interface overlay is no longer a part of the user interface for the video call interface, such that the caller preview video 542 is displayed on the full screen of the callee device. In addition, a callee video 544 is displayed to show the appearance of the callee user as captured by a front camera of the callee device.

Figure 6:
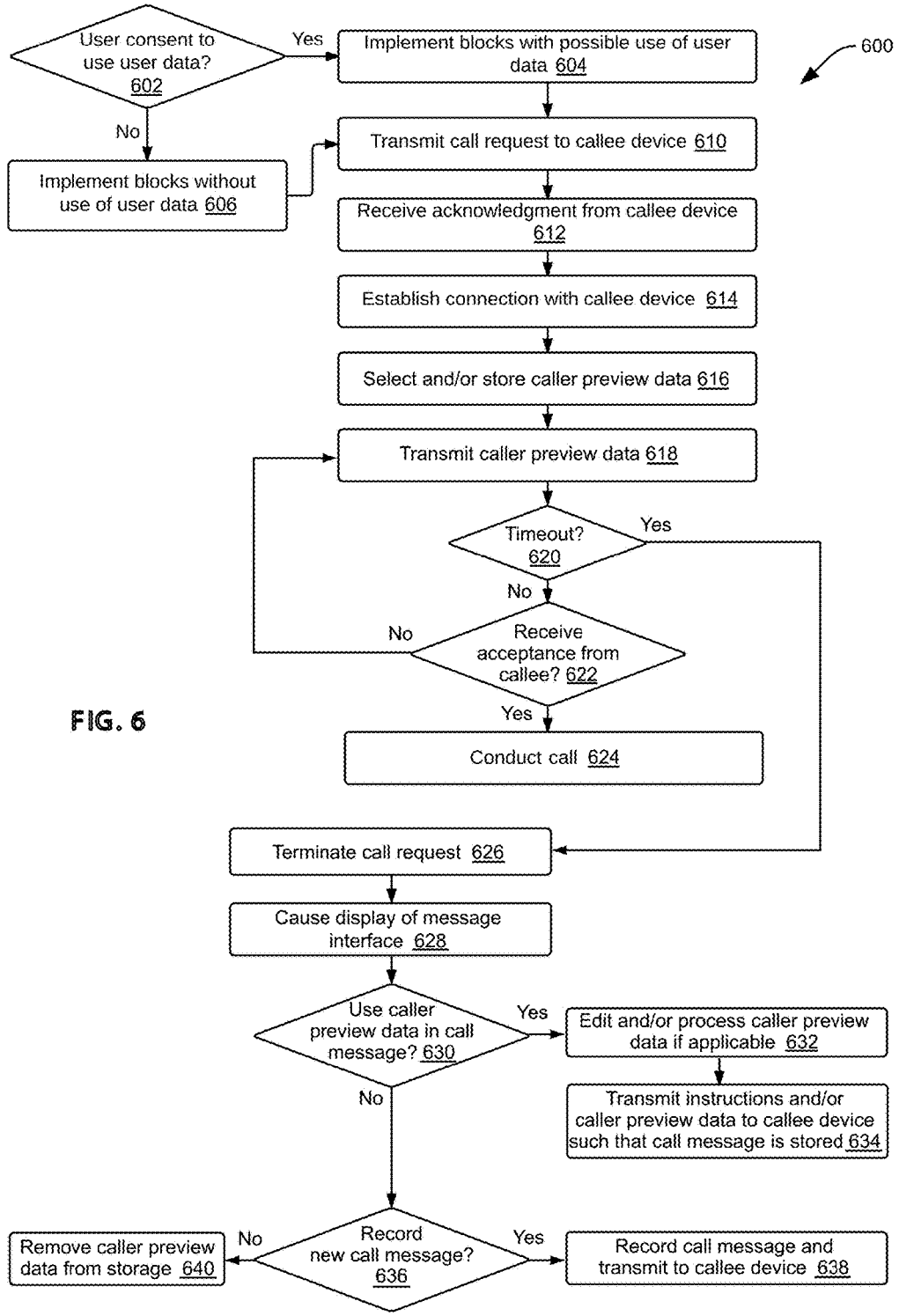
FIG. 6 is a flow diagram illustrating another example method for a caller device, according to some implementations.

FIG. 6 is a flow diagram illustrating an example method 600 for a caller device and including an option to provide a call message, according to some implementations. Some or all of the method 600 can be implemented, for example, on a system such as one or more client devices 120, 122, 124, or 126 as shown in FIG. 1. In some implementations, method 600 can be implemented on a server system 102 as shown in FIG. 1, and/or on both a server system and a client system. In described examples, the implementing system includes one or more processors or processing circuitry, and one or more storage devices. In some implementations, different components of one or more clients and/or servers can perform different blocks or other parts of the method 600.

In block 602, it is checked whether user consent (e.g., user permission) has been obtained to use user data in the implementation of method 600. For example, user data can include user preferences, user biometric information, user characteristics (identity, name, age, gender, profession, etc.), information about a user's social network and contacts, social and other types of actions and activities, content, ratings, and opinions created or submitted by a user, a user's current location, historical user data, etc. One or more blocks of the methods described herein may use such user data in some implementations. If user consent has been obtained from the relevant users for which user data may be used in the method 600, then in block 604, it is determined that the blocks of the methods herein can be implemented with possible use of user data as described for those blocks, and the method continues to block 610. If user consent has not been obtained, it is determined in block 606 that blocks are to be implemented without use of user data, and the method continues to block 610. In some implementations, if user consent has not been obtained, the remainder of method 600 is not performed.

In block 610, a call request is transmitted from a caller device to one or more callee devices. In this description, a single callee is generally described for explanatory purposes, although multiple callees can be provided in some implementations. In various implementations, the caller device may be any device that can conduct calls, e.g., voice calls and/or video calls, and can be a device as described in other implementations herein, such as with respect to FIG. 3. In some implementations, a caller user (e.g., "caller") may select or otherwise input an identifier of a particular callee on the callee device and the call request is transmitted in response to the input, e.g., similarly as described for FIG. 3. In various implementations, a selected identifier of the callee may be associated with one or more callee devices to which the call request is transmitted. In some implementations, the call request may be transmitted to each callee device that is associated with the identifier. In some implementations, the call request may be transmitted to a subset of callee devices that are associated with the identifier. In some implementations, the call request may be transmitted to a single callee device. The method continues to block 612.

In block 612, an acknowledgment is received from the callee device. For example, the acknowledgment may be received from one or more of the callee devices. In various implementations, the acknowledgment may indicate that the one or more callee devices are reachable over a network, e.g., a non-acceptance acknowledgement that does not establish the call. In various implementations, the acknowledgment may be received from the callee device without any action or input from the callee. For example, the callee device may automatically transmit an acknowledgment back to the caller device. The acknowledgement is received prior to an acceptance being received by the caller device from the callee device, e.g., the video call is not yet established between caller and callee devices that allows the caller and callee to communicate. The method continues to block 614.

In block 614, a connection is established between the caller device and the callee device from which the acknowledgment is received. For example, the connection may be established over the network. In various implementations, establishing the connection may be carried out via any suitable protocol, e.g., a session initiation protocol (SIP) or other protocol. In some implementations, a media encoding technique, e.g., an audio/video encoding technique may be automatically selected for the connection. For example, the media encoding technique may be selected based on various parameters including, but not limited to, connection bandwidth, delay and packet loss metrics, processor capability of the caller device and the callee device, etc. For example, a media encoding technique for a lower amount of bandwidth on the connection may compress video data and/or audio data to a greater degree than if a higher amount of bandwidth were present on the connection. In some implementations, the connection may be established such that the caller device can transmit media data, e.g., video and/or audio data, to the callee device, but the callee device cannot transmit media data to the caller device. In some implementations, the connection may be established such that the caller device and the callee device can transmit media to each other via the network. The connection is established prior to receiving an acceptance from the callee device by the caller device, e.g., the call is not yet established between caller and callee devices that allows the caller and callee to communicate.

In some implementations, with user consent to use of such data, it can be determined whether the callee identifier was previously stored in call-related storage associated with the caller (or caller device), in order to determine whether to transmit caller preview data, e.g., similarly as described with respect to block 316 of FIG. 3.

In some implementations, a caller context can be determined based on one or more of multiple factors, e.g., similarly as described with respect to block 318 of FIG. 3. The method continues to block 616.

In block 616, caller preview data is selected for transmission to the callee device, and the selected caller preview data may be stored, e.g., by the caller device or other connected device, in some implementations. For example, a caller preview data segment may be selected from one or more available data segments. In various implementations, the available data segments can include video data segments (videos) that may or may not include audio data, and/or the available data segments can include audio data segments that do not include video data. Videos can include a number of images (e.g., frames) to be displayed sequentially, e.g., at a particular frame rate or duration of display for each frame, or varying frame rates or display durations for frames.

In some examples, the available data segments may include one or more data segments (or data feeds) captured live, e.g., at the current time, or at or after the time of the call request. For example, one or more videos can be captured live by one or more cameras of, or in communication with, the caller device. For example, if the caller device is a mobile phone or other mobile device with one front camera and one back camera, the available videos may include videos captured by each of the front camera and the back camera. Other cameras in communication with the callee device can also or additionally capture live one or more of the available videos. The live video frames that are captured from the camera(s) can be stored on available storage, e.g., memory or other storage device of the caller device or other storage accessible to the caller device. In some implementations, e.g., while a video is being captured by a camera in communication with the caller device, before such a video is to be captured, or after such a video has been captured, the caller device can provide output of an indication (e.g., a displayed notification, audio output, etc.) indicating that at least a portion of the captured video is being stored on the caller device, and/or indicating that the stored captured video, or a portion thereof, is available to be transmitted (or will be transmitted) as a call message. For example, the stored captured video can be available to transmit as a call message if a timeout occurs as described below, and/or if another predefined condition applies (e.g., if the caller selects to send such a call message regardless of timeout).

The capture of live video from one or more cameras allows one or more caller preview videos to be created that depicts present surroundings of the caller, and/or present the caller. For example, a caller can present himself or herself in the caller preview video as captured by the front facing camera on the caller device, as well as a background environment, other persons that are present, and/or other features present at the physical location of the caller.

In another example, the available data segments may include videos or images previously captured by the one or more cameras of the caller device and stored on the caller device. In other examples, the available data segments may include any video (or image, animation, cinemagraph, etc.) stored on the caller device. For example, the available videos can include a plurality of stored images or a video recorded from a previous video call, or a portion (e.g., a motion clip) of a video recorded from a previous call. In another example, if the caller device is coupled to a companion device, e.g., a wearable device such as eyeglasses, smartwatch, wearable camera, etc. that includes a camera, the available videos may include video captured by the companion device. In yet another example, the available data segments may include stock videos, e.g., videos associated with the location of the caller device. In some examples, stock videos may be available from the caller's storage and/or public sources on the internet, for example, e.g., websites, network services, map services, etc. Stock videos can be selected which are relevant to the caller context. In another example, the available videos may include an application video, e.g., a screen capture video captured from the output of one or more applications currently under execution on the caller device or having previously been executed on the caller device or a different device and stored in available storage. Such videos can be similar to those described above for FIG. 3.

One or more available data segments can be audio segments captured live by one or more microphones of the caller device and/or microphone(s) of a companion device. In another example, available audio segments may include audio segments previously captured by the caller device and stored on the caller device. The caller device can output indications for captured audio data similarly as the video data described above. In another example, the available audio segments may include any audio segment stored on the caller device, e.g., stored audio segments recorded from one or more previous calls. Available audio segments can include stock audio segments (e.g., music tracks, speeches, etc.).

In some implementations, the caller preview data segment may be selected based on the caller context, e.g., similarly as described above for FIG. 3, e.g., using one or more selection scores and context factors (caller location, current time, occurring event, visual video content and/or characteristics, audio content, user preferences, spatial orientation of a camera or caller device, etc.). In some implementations, the caller preview data segment may be selected based on user input to the caller device that is effective to select the data segment, e.g., from the caller. While selection of a data segment is described with some examples, any individual data segment or combination of data segments may be selected as the caller preview data segment based on the caller's context.

In some implementations, a selected data segment (e.g., a stored video or audio segment, a portion of a selected video or audio segment, selected live video and/or audio from a camera and/or microphone on the caller device, etc.) can be output by the caller device before it is transmitted to the callee device as the caller preview data. For example, this output can act as a preview to allow the caller to experience (e.g., view and/or hear) one or more data segments that have been automatically selected to be transmitted to the callee as the caller preview data prior to the callee acceptance of the call. The caller can be provided options of accepting and overriding the selected data segment, e.g., after viewing at least a portion of the selected data segment on the display.

In some implementations, it can be determined if the selected caller preview data is to be filtered, and if so, a filter can be applied to the selected caller preview data, similarly as described above with reference to FIG. 3. Input to disable a filter can also be received similarly as described for FIG. 3. In some implementations, the selected caller preview data can be otherwise processed before or during transmission, similarly as described above for FIG. 3. For example, text corresponding to audio and/or visual features in caller preview data can be generated and included in the caller preview data, the caller preview data can be encoded and/or compressed, caller input (e.g., text) can be added to the caller preview data, etc. The method continues to block 618.

In block 618, the caller preview data may be transmitted to the callee device from which the acknowledgment was received. The preview data may be transmitted over the connection established with the callee device, e.g., using the media encoding technique selected for the connection. In some implementations, the caller preview data may be filtered, e.g., video data filtered to omit accompanying audio data from the transmission such that the callee device will not output audio associated with the caller preview video. In some implementations, audio preview data can be included in transmitted video preview data. In some implementations, if the transmitted preview data is a data segment having a defined end or termination (e.g., a stock video or audio segment or other video or audio segment captured or stored at a previous time) and the end of the data segment is transmitted, the caller preview data can be looped one or more additional times, e.g., such that the preview data is transmitted again from its start (e.g., until a timeout occurs as described below, the call request is accepted by the callee, or the call is terminated before acceptance). In some implementations, caller preview data with a defined end can be transmitted once, or a particular number of times, and then no preview data is transmitted further. In some implementations, one or more different default caller preview data segments can be transmitted (e.g., in looped manner or not) after the selected caller preview data segment has reached its end, and/or the one or more successive caller preview data segments can be selected randomly from available data segments, or can be selected from available segments using one or more scores and/or context factors as described herein. The method continues to block 620.

In block 620, it is checked whether a timeout has occurred for the call request. In some implementations, a timeout can occur after a predefined period of time has elapsed starting from the transmission of the call request (e.g., a call request time period), where an acceptance of the call request (or other response) from the callee device is not received during that period of time. For example, a timeout occurs upon expiration of the predefined period of time without receiving an acceptance to the call.

In some implementations, additional and/or other conditions can be checked in block 620 to determine whether the call request is expired or cancelled (e.g., after which the caller device no longer waits for an acceptance of the call request from the callee device). For example, the caller may cancel the call request manually, e.g., hang up the call by providing appropriate input to the call device. In additional examples, such conditions can include the caller device receiving a different call request from a different device (e.g., after a particular amount of time prior to expiration of the caller's call request), receiving a message at the caller device (e.g., email message, text message, chat message, etc.), an event occurring on the caller device (e.g., in a running application on the caller device), etc.

If a timeout has occurred as checked in block 620, then the method continues to block 626, described below. If a timeout has not occurred as checked in block 620, then the method continues to block 622.

In block 622, a timeout has not yet occurred and it is checked whether an acceptance of the call has been received from the callee device. If an acceptance has not been received, then the method continues to block 618 to continue transmitting the caller preview data, e.g., transmit the next one or more frames of a caller preview video and/or next data in a caller preview audio segment. For example, if the transmitting preview data is live video including frames being captured by one or more cameras, then the next one or more frames captured by the camera are transmitted (with accompanying live audio data, if appropriate). If the preview data is live audio (e.g., without video data), the next audio data captured by the microphone is transmitted. If an acceptance has been received in block 622, then the method continues to block 624.

In block 624, an acceptance of the call request has been received from the callee device over the established connection and the call is established and conducted such that the caller and the callee may engage in a call over the connection. For example, the acceptance can be a standard signal or data according to the call communication protocol being used that indicates the callee has accepted the call and that a call communication can now be established between the caller device and the callee device. In some examples, the acceptance may be received in response to the callee providing input to the callee device to answer the call, e.g., by selecting an option to answer the call that is displayed on a display of the callee device, by a voice command, etc. Based on the callee providing the input to answer the call, the acceptance of the call request may be transmitted by the callee device to the caller device. The acceptance of the call request may be received after at least a portion of the caller preview data is transmitted to the callee device. For example, if the caller preview data is a stored video having a defined length, at least a portion of this video was transmitted prior to receiving the acceptance of the call.

In various implementations, the caller preview data transmitted prior to acceptance may or may not need to be changed to different data, e.g., a different data segment or data feed, transmitted from the caller during the established call. For example, in some cases, e.g., if the caller preview data transmitted prior to callee acceptance was a live video and/or audio data of the caller captured by a camera and/or microphone of the caller device, then the source and content of the caller preview data need not be changed upon receipt of the acceptance of the call request (e.g., unless the preview data was filtered), and in some examples, live captured data can continue to be transmitted during the established call similarly as it was transmitted in the caller preview data prior to the callee acceptance. In some example cases, e.g., if the caller preview data prior to callee acceptance is live video data not depicting the caller (e.g., captured by a rear camera of the caller device) or is a video or audio segment previously-captured or recorded, then the caller preview data can be changed after receipt of acceptance of the call request to a live data feed portraying the caller, e.g., being captured by a front camera of the callee device or other camera, or a microphone capturing the caller's voice. In some implementations, if audio transmission was disabled during transmission of preview video data, upon receipt of acceptance of the call request by the callee, audio transmission from the caller device may be enabled, such that the callee device can output received audio data. In some implementations, e.g., when the caller preview data is filtered and input to disable the filter was not previously received, the filter may be disabled in response to receipt of the acceptance of the call request.

Block 626 is performed in response to a timeout occurring as determined in block 620. In block 626, the call request may be terminated. For example, in some implementations, the caller device can send a particular signal (e.g., command) to the callee device to indicate that the call request is terminated. In some implementations, if the call request were continually or periodically transmitted to the callee device, block 626 stops the call request from being further transmitted. Although the call request is terminated, in some implementations, the established connection between the caller device and the callee device (e.g., from block 612) can be maintained, e.g., not terminated. In other implementations, the established connection is terminated with the call request. In still other implementations, the call request is not terminated until the call message is transmitted or after the call message is transmitted (e.g., in block 634). The method continues to block 628.

In block 628, a message interface may be caused to be displayed by the caller device. For example, the message interface can be displayed on a display screen of the caller device. In some implementations, the message interface can include one or more controls receptive to user input, e.g., displayed buttons, sliders, or icons on a touchscreen, physical buttons and other controls of the caller device that can be selected and/or manipulated by the caller, etc. In some implementations, the message interface can include an option (e.g., user interface element) that can be selected by the caller, to enable at least a portion of the caller preview data to be used as a call message. A call message (e.g., voice mail, video mail, voice message, video message, etc.) is a message that is transmitted to a callee device to be stored on the callee device and which can be accessed by a callee and output by the callee device (or other device) as selected by the callee at a later time, e.g., allowing the callee to access and experience the message at a time outside of a call. For example, a call message can be a video message that is a video and which can include audio data. A received video message stored by the callee device (or stored in storage accessible to the callee device) can be commanded to be displayed on a display of the callee device in a viewing application running on the callee device at any time by the callee. In some implementations, the call message can be an audio message that does not include video data and can be output by speakers of the callee device. In some implementations, the call message can be or include a text message, an image, a cinemagraph, or other types of content data.

The message interface can also include one or more controls enabling user input to select to output all or portions of the caller preview data by the caller device, e.g., in advance of creating a call message from caller preview data. The selected portions can be output by the caller device as a form of preview to the caller. For example, a view area in the message interface can display selected portions of caller preview video data at a selected frame rate or display a particular selected frame of the video data as a still image. Portions of caller preview audio data can be selected and output by one or more speakers of the caller device.

In some implementations, the message interface can display an automatic suggestion, a notification, or a request for the caller to allow the caller preview data to be provided to the callee device as a call message. For example, the request can include one or more selectable options, including options to transmit the entire caller preview data as a call message to the callee device, transmit a portion of the caller preview data as a call message to the callee device (e.g., automatically selecting a portion of the caller preview data or allowing the user to edit or select a portion of the caller preview data to transmit), or not transmit the caller preview data as a call message (e.g., remove or delete the caller preview data). Other options can also be displayed. For example, options can be displayed to cause audio data of the caller preview data to be transcribed to text as described herein.

One (or more, if applicable) of these options can be selected by the user. Some examples of a message interface are described below with reference to FIGS. 8A-8E. In various implementations, the message interface can be displayed immediately after the call request is terminated, immediately after the timeout occurs, and/or a period of time after the call request termination and/or timeout. For example, in some implementations, the message interface can be displayed in response to one or more predefined conditions being met in addition to the timeout, e.g., the caller device being at one of a set of particular locations (e.g., a home location), at a particular time (e.g., a time of day, or day of week or month, etc.), etc. In some implementations, the message interface can be displayed in response to the one or more predefined conditions without the timeout having occurred, e.g., at a time prior to a potential timeout.

In some implementations, other predefined conditions can be checked to provide the message interface (e.g., automatic suggestion or notification) as described above. For example, if user consent has been obtained, a system (e.g., the caller device or other system in communication with the caller device) can process frames of the caller preview data to determine whether particular visual content is present or depicted in one or more frames of the caller preview data, and/or determine whether particular visual content is absent from the caller preview data. In some examples, the particular visual content can be particular types of image features such as faces, faces smiling, a person waving their hand, particular objects, etc. (or the predefined condition can be an absence of such a feature). For example, if user consent has been obtained, image analysis, detection and recognition techniques can be used to detect such features in the caller preview data. In some implementations, if user consent has been obtained, the system can use audio analysis, detection, and recognition techniques (e.g., speech recognition techniques) to detect features in audio data of caller preview data. In additional examples of predefined conditions, the system can check whether a particular social relationship is present between the caller and the callee, if user consent has been obtained from caller and callee to check for such a relationship. For example, the particular social relationship can be provided where caller and callee identifications are stored in a database that stores connection information that indicates a social relationship between the caller and callee. In some examples, a social relationship can be indicated if identifications of the caller and callee are stored within each other's contact lists stored on the caller device and callee device, caller and callee identifications are stored in each other's created user groups stored in a social networking service, and/or caller and callee are indicated to have previously communicated using the social networking service or devices. The method continues to block 630.

In block 630, it is checked whether to use at least a part of the content of the caller preview data in a call message to transmit to the callee device, e.g., whether a call message is to be based on the caller preview data. For example, the caller may have selected an option in a message interface of block 628, or selected an option from a displayed notification or request, indicating whether or not to use the caller preview data for a call message. In some implementations, stored user preferences associated with the caller may indicate whether a call message following a call request should be based on caller preview data that was transmitted during the call request. In some implementations, the caller preview data can be selected to be used for a call message based on user preferences of the caller that indicate particular conditions that, if present, allow the caller preview data to be used for a call message automatically. For example, stored user preferences associated with the caller can indicate particular types of content detected in the caller preview data (where the types of content can be detected by the caller device, if user consent has been obtained, using image object detection or recognition techniques for visual content in video data and/or speech detection or recognition techniques for audio content in audio data), identifications of callees for the call request, identifications of persons depicted or portrayed in caller preview data (such as the caller), locations of the caller device at the time of sending a call message (e.g., at home, at work, etc.), time of day or current time when sending a call message, and/or other contexts for which it is acceptable to automatically use at least a part of the content of caller preview data for a call message. Such user preferences can also indicate whether or not to send a call message to the callee device based on one or more conditions similarly as described above, as indicated in the preferences.

If it is determined in block 630 to use the caller preview data for a call message, then the method continues to block 632, in which the caller preview data may be output, edited and/or processed using the caller device, if applicable. In some implementations or cases, the caller preview data that was sent (or partially sent) to the callee device in block 618 can be used as a call message in its entirety, e.g., without any edits or changes to the caller preview data. For example, the caller may have selected an option in the message interface of block 628 to use the entire transmitted caller preview data as the entire call message.

In some implementations or cases, the caller preview data can be output (e.g., displayed or played) and/or edited in one or more ways before being transmitted or designated as a call message. For example, caller preview video data can be edited based on caller input (e.g. via an input device of the caller device such as a touchscreen, pointing device, microphone and voice commands, etc.) such that one or more frames of the video preview data are removed or changed, such that the edited caller preview data forms the call message. In some examples, one or more values (e.g., colors) of pixels of one or more frames of a caller preview video can be changed, e.g., to add one or more special effects, visual features, changes in brightness, contrast, etc. In some implementations, one or more frames can be added to a caller preview video to form the call message. For example, the caller can select a different accessible video and/or frames of that video to add to the caller preview video, e.g., at caller-designated locations in the caller preview video.

In some examples, the caller provides user input to select in the message interface to edit the caller preview data. For example, an editing interface can be displayed on the caller device to display frames of a transmitted caller preview video, and includes various video editing controls receptive to caller editing input. For example, the controls can include a play button, fast forward and rewind controls, sliders to control playback speed, controls to select particular frames of the caller preview video to display, remove, move within the video, duplicate, etc. For example, frames of the caller preview video can be removed to shorten the caller preview video, remove frames that do not depict particular features, remove all video frames such that only audio data of the caller preview video remains, etc. In addition, controls can be provided to modify selected frames of the caller preview video, e.g., change colors, brightness, contrast, or other visual characteristics of pixels of the frames of the caller preview video, insert pixels or images into frames of the caller preview video, change pixels via drawing tools, add text to particular frames of the caller preview video, add special effects (e.g., convert to black and white or sepia-tones, add fireworks, emojii, etc.), etc. In some examples, editing input in the interface from the caller can select a start point of the caller preview video, such that portions of the caller preview video prior to the start point in the frame sequence of the video are deleted or otherwise excluded from the video. Editing input can select an end point of the caller preview video, such that portions of the video after the end point in the video frame sequence are deleted or otherwise excluded from the caller preview video.

Similar controls can be provided to edit portions of audio data. For example, the edit interface can provide controls to edit transmitted audio preview data that did not include video data. In some implementations, the edit interface provides controls to allow the caller to remove all or a portion of audio data accompanying preview video data, add audio data to preview video data, or to change existing audio data associated with video preview data. For example, speech audio data can be added to a caller preview video (or other video) to form the call message, e.g., record the caller's voice with a microphone and add the recorded audio data, or add other stored audio data to the video data. In some implementations, the edit interface can provide input options to enable the caller to input one or more new text messages that are to be combined with the caller preview data in the call message (e.g., input via a keyboard, transcribed from speech via speech recognition, etc.). The edit interface can also display text in the call message (e.g., transcriptions) that has been generated from speech in audio data of the caller preview data (as described herein), and can enable caller input to delete, add to, and/or modify portions of such text, and/or separate portions of the generated text into separate text messages that are configured to be displayed as discrete text messages by the callee device.

In some implementations, automatic modifications or edits can be made by a system to the caller preview data (e.g., by the caller device and/or other connected system). In some implementations, such edits can be based on user preferences as described above. In some implementations, such edits can be based on visual content in the caller preview data. For example, the system can perform image analysis on a caller preview video to detect particular visual features in frames of the video. In some examples, visual features can include objects (person, car, house, table, ball, cake, etc.), terrain features (e.g., mountain, lake, sky, sunset, etc.), etc. In some implementations, the system can automatically remove one or more frames of a caller preview video that do not depict the particular visual features. For example, the visual features can include the caller, or types of features such as faces, smiling faces, persons, etc. In some implementations, the system can automatically remove one or more frames that depict particular visual features, e.g., features indicated in user preferences.

In some implementations, the system can automatically remove frames of the caller preview video that have particular visual characteristics. For example, frames that are of poor visual quality can be frames that are underexposed or overexposed, blurry, have noise, etc., as determined based on comparing these visual characteristics to particular predefined thresholds for these characteristics. In some implementations, the system can automatically extract or keep audio data from a caller preview video and discard the video frames of the caller preview video, such that the call message is formed as the audio data of the caller preview video (or a portion of that audio data) without the video data. For example, user preferences or caller selections may have instructed such edits. In another example, the system can automatically keep the video frames from a caller preview video and discard associated audio data of the caller preview video, such that the call message is formed as the video frames of the caller preview video (or a portion of the frames) without the associated audio data.

In some implementations, such automatic edits can be based on audio content in the caller preview data. For example, the system can perform audio data analysis on caller preview audio data to detect particular audio features in portions of the audio data. In some examples, if user consent has been obtained, audio features can include sounds (e.g., vehicle, music, birds, bells, children, lawnmower, etc.), voices or speech, or other sounds. In some implementations, the system can automatically remove one or more portions of caller preview audio data (and/or video data of the caller preview data that is associated with those portions) that do not exhibit the particular audio features. In some implementations, the system can automatically remove one or more portions of the audio data (and/or associated video data) that exhibit particular audio features, e.g., features indicated in user preferences or other stored reference data.

In another example, the system (e.g., caller device or device in communication with the caller device, e.g., a server system) can automatically detect speech or one or more voices in audio data, e.g., audio preview data that does not include video data, and/or audio data that is included in or accompanies caller preview video data (e.g., audio data that is synchronized with particular frames of the caller preview video). The system can automatically remove audio data from a preview audio data segment, where the removed audio data does not output the voice or speech of the caller, or can remove portions of the audio data segment that are of poor quality, e.g., noisy with audio noise, have low audio magnitude below a particular threshold magnitude, etc.

In some implementations, the system can use one or more voice recognition techniques (if user consent has been obtained) to recognize the words spoken by the detected voices, and can generate and insert text (e.g., text captions or subtitles) to caller preview video data to be displayable in respective frames that are associated with speech output (e.g., spoken works) in the audio data that corresponds to the text, e.g., transcribe text from the speech. For example, the text can be provided in the video to be displayed synchronized to when the corresponding words are output in the audio data. In some examples, the added text can be inserted in place of removed audio data, or can be added to supplement audio data. In some implementations, if the caller preview data is audio data, and no audio data is to be transmitted in a call message (e.g., due to callee preferences, etc.), then the caller preview data is ignored and the corresponding generated text is provided in a text message or similar electronic message created by the system. Some implementations can output options on the caller device to allow the caller to select whether to provide transcriptions and/or one or more text messages in the call message.

In some implementations, the system (e.g., the caller device or other system in communication with the caller device) can automatically verify that one or more particular content features (e.g., visual features and/or audio features) are exhibited by the part of caller preview data to be used as the call message (e.g., exhibited by the call message, if it has been created), if user consent has been obtained to permit detection and recognition of content features. For example, the system can verify whether one or more particular visual features are depicted by pixels in one or more frames of the part of caller preview data. For example, the visual features can include examples as described above. Similarly, the system can verify whether one or more particular audio features are exhibited by one or more portions of audio data in the part of caller preview data, such as audio features described herein. If it is verified that the particular content features are included in the part of caller preview data, then the method continues to block 634 to transmit the part of caller preview data as a call message. If the particular features are not verified to be included in the part of caller preview data, then in some implementations, the caller preview data is not transmitted in block 634. Some implementations can output a notification from the caller device indicating the condition that prevents transmission.

In some implementations, the system (e.g., caller device, callee device, or other connected system) can use one or more image recognition techniques on video data or image data of the caller preview data, if user consent has been obtained, to recognize image features (e.g., objects, landscape features, etc.) and automatically generate text based on the image features. For example, the generated text can include descriptions based on visual content of the caller preview data. In some examples, the generated text can include words and phrases previously associated with recognized visual features of caller preview video data or image data. In some implementations, the generated text can include topics, categories, etc. related to generated text and detected image features, as determined from accessible information sources (e.g., dictionaries, thesaurus, knowledge base graph, etc.). For example, generated text descriptions can include "sunset," "evening," "beautiful," etc. for a scene depicting a sunset. In some implementations, machine learning techniques can be used to generate text based on visual features and/or audio features in the caller preview data.

In some implementations, the caller preview data can be processed by the system (e.g., the caller device or other connected system) to create or form the call message. For example, the caller preview data can be encoded using one or more encoding or compression techniques to compress the caller preview data such that it occupies less storage space. In some implementations, the amount of compression can be determined based on various factors, including, for example, an amount of time used by the encoding process, power used by the system in performing the encoding, the quality of the call message after encoding, and the size of the compressed data. In some implementations, an encoded call message may be based on and different than the previously-transmitted caller preview data (which may also have been encoded). For example, the encoded call message may be encoded to have a different size and/or quality than the encoded caller preview data even if the entire caller preview data is used as the entire call message. For example, a different encoding technique may have been used to encode the caller preview data for transmission than the encoding technique used for the call message. In some cases, the quality of the call message can be greater than the quality of the caller preview data (e.g., have more video frames, and/or frames of greater pixel detail or resolution, have a greater sampling rate, etc.) due to bandwidth restrictions and other restrictions during caller preview data transmission that may have limited the quality of the caller preview data (e.g., transmitted caller preview video data may have had dropped frames, lesser-quality compression, etc. due to a connection to the callee device that was intended for live two-way call communication and thus had less bandwidth for the caller preview data).

For example, the caller preview data in the call message may be at a different resolution than the audio data and video data in the transmitted caller preview data. In some examples of different resolutions, for video data, the call message can be at a different pixel resolution, color depth, compression ratio, etc., and for audio data, the call message can be at a different compression ratio, bit rate, fidelity, etc. In some examples, the call message can be a version of the caller preview data, e.g., the call message includes a different resolution version of at least one of the audio and the video, e.g., data providing the same video frames and/or audio data as the caller preview data and at a different (e.g., higher) resolution than the caller preview data. The call message can also or alternatively be one or more other types of versions of the caller preview data, e.g., have frames that are cropped from the caller preview data (such that portions of frame are removed), a different number of frames or amount of data from the caller preview data, have additional (e.g., interpolated) frames compared to the caller preview data, have blurring, sharpening, texturing, or other filtering or visual modifications and effects compared to the caller preview data, etc. The method continues to block 634.

In some implementations, one or more of the automatic processing techniques described above can be performed after receiving input from the caller. For example, the caller can confirm or select particular processing to be performed.

In block 634, information is transmitted to the callee device that instructs that a call message be stored on the callee device. In some implementations, the transmitted information includes at least part of the caller preview data, which is transmitted to the callee device as a call message. In some examples, e.g., where the caller preview data includes video data, the call message includes a plurality of portions of video data, e.g., a plurality of frames (e.g., at least some frames, or at least a portion of the frames) of the caller preview video. For example, the entire transmitted caller preview data can be transmitted as the call message in some implementations or cases, e.g., if the caller or system did not edit the caller preview data. In some cases, the caller preview data may have been modified to generate the call message, e.g., one or more frames or other portions of the caller preview data deleted, moved within the sequence of caller preview data, modified, and/or additional frames or other portions added to the caller preview data. In some implementations, a video call message can include audio data associated with caller preview video data, even if the caller preview video data did not include the associated audio data when it was previously transmitted in block 618, e.g., due to being filtered. In some implementations, audio data may have been removed from caller preview data to create the call message. In some implementations, the call message may be a text message that includes text corresponding to speech detected in caller preview audio data (e.g., using speech recognition) and does not include audio data. In some implementations, the call message can include audio data and/or video data and also include one or more text messages having text associated with (e.g., corresponding to or generated from) speech in caller preview audio data. In some implementations, the call message may be or include one or more text messages that include text associated with (e.g., generated from) one or more visual features detected in caller preview video data (e.g., using image recognition techniques with user consent), and/or text provided from a user (e.g., the caller).

In some implementations, the call message can be transmitted over the established connection between the caller device and the callee device. In some implementations, a new connection can be established between the caller device and the callee device and the call message can be transmitted over the new connection to the callee device.

In some implementations, the callee device receives the transmitted call message and stores the call message data in accessible storage. The callee can access the stored call message at a desired time, e.g., cause display or other output of the call message, as described in greater detail with respect to FIG. 7.

In some implementations, the information transmitted to the callee device does not include caller preview data, e.g., such that caller preview data is not transmitted to the callee device in block 634. For example, the call message can be formed at least in part from the caller preview data that was previously transmitted to the callee device in block 618. In some examples, the transmitted information includes a command that is transmitted from the caller device to the callee device that instructs the callee device to use at least part of the content of the caller preview data that was previously transmitted to and stored on the callee device, e.g., in block 618, as the call message. In some examples, the entire caller preview data that was transmitted in block 618 was stored by the callee device at the time of receiving that transmission, if consent of the callee has been obtained (e.g., in callee user preferences). The stored caller preview data can be designated as the call message by storing the caller preview data to be accessible on the callee device, e.g., in a call message interface of the callee device. For example, this may save the processing resources that would otherwise be needed to re-transmit the call message in block 634. In some examples, a portion of the caller preview data that was previously transmitted in block 618 is commanded to be designated as a call message. For example, the transmitted command can designate one or more particular portions of the previously-transmitted caller preview data to be retained or stored on the callee device as the call message, where the other portions of the previously-transmitted caller preview data not so designated can be removed or deleted from callee device storage.

In some examples, the system can determine whether to transmit at least part of the caller preview data in block 634 as the call message, and/or whether to command/designate at least a portion of data previously transmitted in block 618 as the call message. For example, the system can decide to transmit caller preview data in block 634 in response to the previously-transmitted caller preview data being incomplete or having one or more characteristics below a particular threshold, and the caller preview data to be transmitted in block 634 is more complete and/or has threshold-meeting characteristics. For example, the previously-transmitted caller preview data may have had below-threshold characteristics such as lower pixel resolution, missing frames (e.g., that were skipped), color noise or audio noise, or have other characteristics below thresholds, e.g., due to transmission requirements. In another example, the previously-transmitted caller preview data may be incomplete if it was transmitted without some of its portions (e.g., frames), and/or if it was transmitted without its associated audio data or video data, e.g., due to transmission restrictions and/or if such audio data or video data was filtered by the callee device or caller device, etc. For example, in some implementations or cases, device settings or user preferences may not allow the caller preview data transmitted in block 618 to have been stored on the caller device at the caller preview stage (e.g., prior to a timeout of block 620). However, such settings or preferences may allow a call message transmitted in block 634 to be stored on the callee device, in which case the caller preview data can be transmitted in block 634. In some implementations, a portion of the caller preview data is transmitted in block 634 as additional data instead of transmitting all of the caller preview data, and the additional data is combined with previously transmitted caller preview data as described below. In some implementations, the system can determine whether to transmit caller preview data in block 634 based on caller preferences, callee preferences, and/or user input received in a displayed interface on the caller device (e.g., the caller selecting to transmit caller preview data for block 634 in response to a displayed option or prompt on the caller device).

In some implementations, the caller device can send a command to use at least a part of the content of the previously-transmitted and -stored caller preview data for the call message, and can also send additional data that is instructed to be combined with the content of the caller preview data stored on callee device to create the call message. For example, the additional data can be data that is to be inserted at the beginning of the caller preview data (e.g., frames inserted at the beginning of the caller preview video sequence or audio data inserted at the beginning of the caller preview audio sequence), appended to the end of the caller preview data (e.g., at the end of the sequence of video and/or audio preview data), inserted at a particular specified point in sequential data of the caller preview data (e.g., in the middle of the sequence of video and/or audio preview data), etc. In some examples, the additional data can include portions (e.g., video frames, audio data, etc.) that were originally captured in data that provided the caller preview data but which were not transmitted in block 618, e.g., due to transmission requirements or other restrictions, or portions which were transmitted in block 618 in altered form (e.g., with reduced pixel resolution, filtered, etc.). In additional examples, the additional data can include data from previous caller preview data or call messages, stored stock video or audio segments, or other stored data accessible to the caller device. In some examples, the additional data can include data input by the caller after timeout occurs (or prior to call request), e.g., input provided in a message interface of block 628 or editing interface, e.g., similarly as described below for block 638. In some implementations, if a portion of the caller preview data was previously transmitted to the callee device and an additional (e.g., remaining) portion was not transmitted before the timeout occurred, then the caller device can transmit the additional portion of the caller preview data to the callee device to be combined with the portion of the caller preview data that was previously transmitted and stored at the callee device, to form a complete call message.

If it is determined in block 630 that the caller preview data is not to be used to form a call message, then the method continues to block 636, in which it is checked whether the caller has provided input indicating to capture or record a new message as a call message. For example, the caller may provide input in the displayed message interface and/or in response to a displayed request that a new message is to be created. In some implementations, stored user preferences can indicate that the caller would like to create a new message. For example, a stored preference can designate one or more conditions that, if met, automatically indicate that a new message is to be created for a call message. For example, the conditions can include a particular type(s) of content being detected, or not detected, in the caller preview data, if user consent has been obtained. In some examples, if the system does not detect the caller visually depicted in caller preview video data and/or detect the caller's voice in caller preview audio data (or does not detect that the caller is present in at least a certain threshold number or percentage of video data or audio data), then the preferences can instruct that a new call message is to be created. Another example of a condition can include the geographical location of the caller device (e.g., not at a work location), allowing the recording of a call message to be automatically instructed. Other conditions can be checked similarly as described above for the check of block 630.

If it is determined in block 636 that a new call message is to be received, captured, or recorded, then the method continues to block 638, in which a call message is received and/or recorded by the callee device (or other connected device) and the call message is transmitted to the callee device. For example, the call message can be a video message in which one or more cameras of the caller device capture video frames to form the video message. In some examples, the call message can capture frames depicting the caller, the environment surrounding the camera(s), etc. In some implementations, videos captured from multiple cameras of the callee device (e.g., front and back cameras) can be combined into a single call message. In some implementations, the call message can include one or more stored videos or stock videos that were recorded prior to the current time, e.g., videos stored on the caller device or other accessible storage and selected by the caller from a displayed menu or by inputting a command. In some implementations, an editing interface can be displayed to allow the caller to edit the new video message before it is transmitted, similarly as described for block 632. Some implementations can allow the caller to record a new audio call message that does not include video, or select a stored audio call message stored in accessible storage. Some implementations can allow the caller to input new text data, e.g., one or more text messages, that is included in the call message, similarly as described above.

The call message can be transmitted to the callee device using the established connection or over a new connection that is created, similarly as described for block 634. The transmitted call message can be stored on and output by the callee device or other storage or device, e.g., in response to callee input.

If it is determined in block 636 that a new call message is not to be recorded, then the method continues to block 640, in which the caller preview data may be removed from storage of the caller device in some implementations. For example, the caller preview data may have been stored in block 616, and after determining that the caller preview data is not to be sent as a call message, the caller preview data can be removed or marked for removal from storage. In some implementations, the caller preview data is not removed. For example, user preferences, default preferences, or other settings may cause caller preview data to remain stored for a longer period of time. Such storage can continue until one or more conditions occur, after which the caller preview data can be automatically deleted. For example, the conditions can include a caller providing input indicating to delete the caller preview data, a time limit since the creation of the caller preview data has expired, etc.

In some implementations, caller preview data can be stored and designated by the caller, or automatically designated, to be used as a call message for future calls or to be presented as an option for use as a call message for future calls. In one example, after viewing or hearing the call preview data using the message interface, the caller may designate the caller preview data as a "favorite" call message, e.g., by selecting a menu option or inputting an appropriate command to the caller device. The designated caller preview data is then stored for later access, e.g., in caller device storage or other accessible storage. This designation can be performed regardless of whether the caller preview data was transmitted as a call message for the current call. In a later, future call, an identification of the designated caller preview data can be presented to the caller as an option, e.g., after block 630 determines that current caller preview data is not to be used for a call message. The option, if selected by the caller, causes the designated caller preview data to be transmitted to a callee device as a call message for that call. In some implementations, designated caller preview data can automatically be transmitted as a call message in a future call. In some implementations, multiple stored caller preview data segments that were previously designated by the caller can be presented to the caller, e.g., by the caller device, and the caller can select one (or more) of the designated caller preview data segments to be transmitted as a call message for a particular call.

In some implementations, text transcriptions can be added to caller preview video data and/or to a video call message. For example, if user consent has been obtained, voice recognition software can be utilized to recognize the words spoken by the caller or other persons depicted in caller preview video data as indicated in audio data accompanying preview video data. The system can add the text corresponding to the spoken words to the video frames of the caller preview data and/or call message. For example, the text can be added near the bottom, top, or other area of the video frames. This allows, for example, caller preview videos to be received at the callee device and the words spoken in the videos to be viewed by the callee without having associated audio be output at the callee device. Similarly, text corresponding to works spoken in a call message can be added to video frames of the call message. If the text has been added to the caller preview video data, the call message based on that preview video data can include the same text, for example. This can be useful in situations where the callee does not want audio to be output for caller preview video data that is transmitted before acceptance of the call, and also useful to encourage callers to speak when transmitting live caller preview video data, knowing that their words will be observed by the callee as text transcriptions.

In some implementations, a caller may designate, prior to, during, or after selecting or creating caller preview data, whether to provide a call message based on that caller preview data. For example, prior to transmitting the call request in block 610, the caller device can display a request for the caller to indicate whether caller preview data for the current call should be used as a call message if the callee does not accept the call request. If the caller provides input indicating that the caller preview data should be used as a call message, then the caller device can send (or command) the caller preview data to the callee device as a call message after the timeout of block 620, e.g., automatically or with additional caller confirmation. Otherwise, the system can request further caller input after the timeout.

Figure 7:
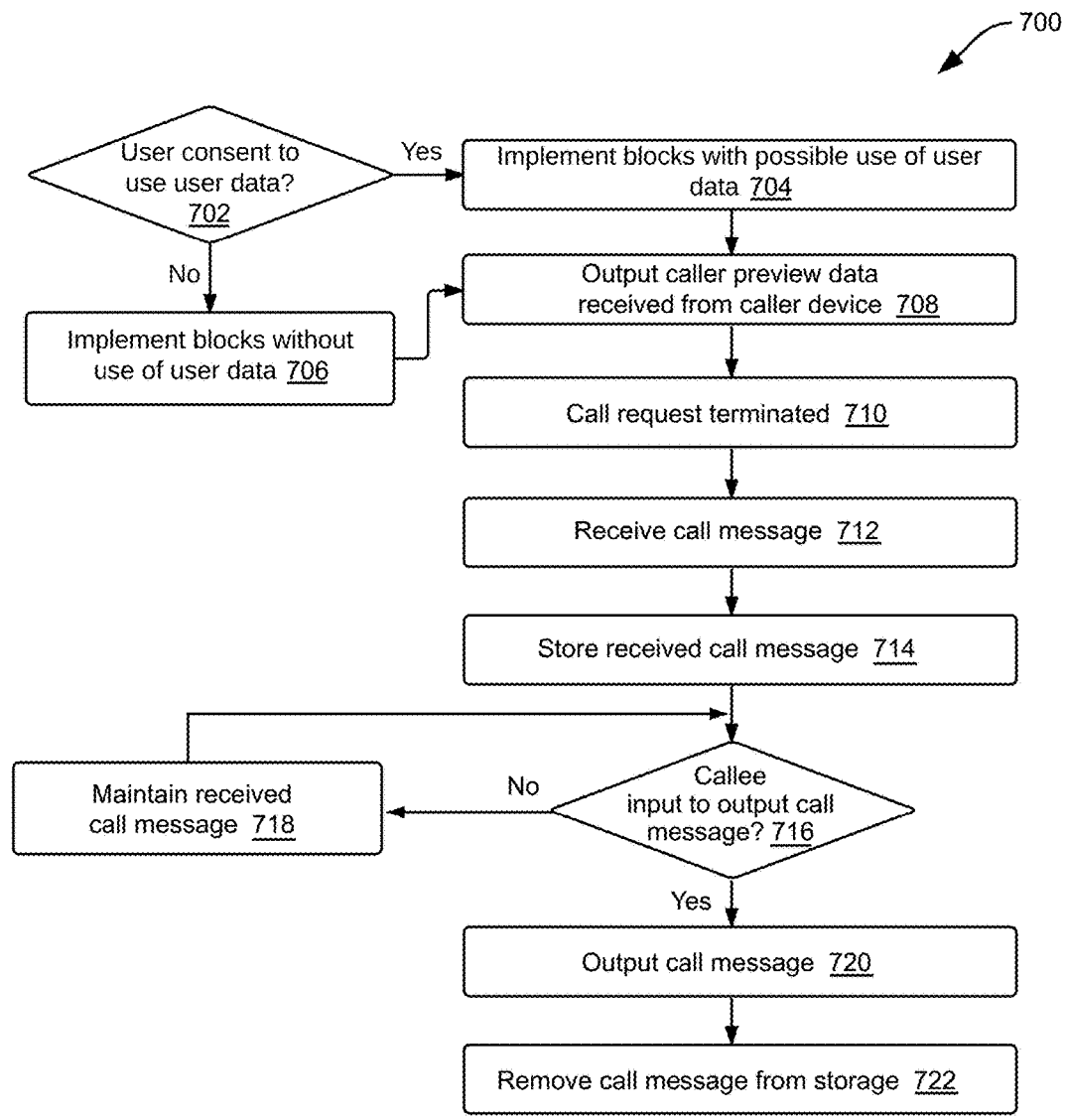
FIG. 7 is a flow diagram illustrating another example method for a callee device, according to some implementations.

FIG. 7 is a flow diagram illustrating an example method 700 for a callee device receiving a call message, according to some implementations. Some or all of the method 700 can be implemented, for example, on a system such as one or more client devices 120, 122, 124, or 126 as shown in FIG. 1. In some implementations, method 700 can be implemented on a server system 102 as shown in FIG. 1, and/or on both a server system and a client system. In described examples, the implementing system includes one or more processors or processing circuitry, and one or more storage devices. In some implementations, different components of one or more clients and/or servers can perform different blocks or other parts of the method 700.

In block 702, it is checked whether user consent (e.g., user permission) has been obtained to use user data in the implementation of method 700. For example, user data can include user preferences, user biometric information, user characteristics (identity, name, age, gender, profession, etc.), information about a user's social network and contacts, social and other types of actions and activities, content, ratings, and opinions created or submitted by a user, a user's current location, historical user data, etc. One or more blocks of the methods described herein may use such user data in some implementations. If user consent has been obtained from the relevant users for which user data may be used in the method 700, then in block 704, it is determined that the blocks of the methods herein can be implemented with possible use of user data as described for those blocks, and the method continues to block 710. If user consent has not been obtained, it is determined in block 706 that blocks are to be implemented without use of user data, and the method continues to block 710. In some implementations, if user consent has not been obtained, the remainder of method 700 is not performed.

In block 708, caller preview data received from a caller device is output by the callee device. For example, the caller preview data can be received over an established connection with a caller device, where the connection was established similarly as described above with reference to FIGS. 3 and 4. For example, block 708 can be performed after blocks similar to blocks 410-416 of FIG. 4 (not shown in FIG. 7) (e.g., receiving a call request, sending an acknowledgment, establishing a connection, determining that caller preview is enabled at the callee device, etc.). In some examples, the caller preview data can be displayed on a display of the callee device, e.g., a display screen. For example, video, image, text, and/or graphical data (e.g., line drawings, icons, etc.) can be displayed. In some examples, audio data of the caller preview data can be output (e.g., played) by speakers of the callee device. In some examples, audio data can be output instead of or in addition to a ringtone of the callee device, similarly as described for FIG. 4. In some examples, the audio data of the caller preview data can be transcribed into text by the callee device (or generated text is received from the caller device). Such text can be displayed on the callee device, e.g., while or after the caller preview audio data and/or a ringtone of the callee device is output as audio from the callee device. In some implementations, text generated from caller preview audio data can be displayed by the callee device as one or more text messages, e.g., displayed in a text message interface or chat interface provided by the callee device. In some implementations, received or generated text (e.g., one or more text messages, text captions, etc.) can be displayed that includes descriptions automatically generated by a system (e.g., callee device, caller device, and/or other system) based on visual content of the caller preview data as described above. In some examples, caller input data included in the caller preview data can be output.

In some implementations, the caller preview data can be filtered, similarly as described above. For example, video filters may have been previously applied or are currently applied for output on the callee device. In another example, audio filters may cause audio data originally included in the caller preview data to not have been transmitted, or cause received audio data to be muted and not output by the callee device. Preferences, settings, and/or options for audio data output can be used similarly as described in various implementations herein. In some implementations, the callee device (or a device in communication with the callee device) can determine, insert, and/or display text corresponding to detected speech present in the audio data, e.g., while muting audio output, similarly as described in various implementations herein. In some implementations, a specialized user interface and/or visual indicators are displayed to indicate that the caller preview data is preview data that is being received prior to a call being established, similarly as described above with reference to FIG. 4.

In block 710, the call request from the caller device can be terminated. This may have occurred due to any of multiple reasons. For example, as described with reference to FIG. 6, a timeout may have occurred due to a time period expiring, where no acceptance of the call was provided by the callee device during the time period, or the caller may have selected to cancel the call request, etc. In some implementations, the call request is not terminated until the call message is received by the callee device, e.g., in block 712 below. The method continues to block 712.

In block 712, the callee device receives a call message. For example, as described above with reference to FIG. 6, the call message can be a message that is based on caller preview data previously received by the callee device in block 708. In some examples, if the caller preview data included video data, the call message can include one or more frames from the caller preview video data (and/or image data). If the caller preview data included audio data, the call message can include one or more portions of the caller preview audio data. In some implementations, the caller preview data can include text. In some implementations, the call message can be or include a newly-recorded message or data, a previously-recorded message or data, an audio-only message, etc. The call message can include caller input, e.g., text data, graphical data, etc. The call message can be received over the same connection used by the caller preview data, or over a new connection established with the caller device. In some implementations, the callee device can perform processing on the call message, e.g., filtering, encoding or decoding, compression or decompression, automatically generating and adding text based on audio data and/or video/image data in the call message, etc., similarly as described above. The method continues to block 714.

In block 714, the callee device stores the received call message in accessible storage. For example, the call message can be stored in local storage (e.g., memory, etc.) of the callee device, and/or in remote storage of a different device that is accessible to the callee device, e.g., over a communication network. The method continues to block 716.

In block 716, it is checked whether input has been received from the callee user to cause an output of the stored call message. For example, the callee can input a command, select a menu option or other interface element in a displayed user interface, or provide other input to select the stored call message for output by the callee device or by a different device. In some examples, a list of identifiers of received and stored call messages can be displayed in a user interface to indicate the call messages that have been received by the callee. Various implementations can provide a list of identifiers for only unread call messages (e.g., call messages previously viewed by the callee), or both unread and read call messages. In some implementations, call messages can be referenced in or selected from other forms of messages, e.g., text messages displayed in a text message or chat interface and providing a link to the call message, email messages displayed in an email inbox, instant messages displayed in a chat interface, etc.

If no callee input to output the call message has been received as checked in block 716, then the method continues to block 718 to maintain the received call message in storage. The method continues to block 716 to wait for callee input. In some implementations, a time limit can be provided such that the call message is automatically removed, deleted, moved to another location, etc. after a predefined period of time has elapsed without the callee accessing or viewing the call message.

If callee input commanding output of the call message is received in block 716, then the method continues to block 720 in which the call message is output. For example, if the call message is a video message, it can be displayed in a user interface on a display, e.g., by a viewing application or other application running on the callee device or other device. A video message can also include audio data that is provided as audio output, e.g., from speakers or other audio output component of the device providing the output (e.g., the callee device). If the call message includes only audio data, the audio can be output via speakers. The user interface can include playback controls to control output of the call message, a slider bar to control the message portion to be output, fast forward and rewind controls, etc. In some implementations, the callee device can determine, insert, and/or display text corresponding to detected speech present in the audio data, e.g., while muting audio output, similarly as described above for the caller device. The method continues to block 722.

In block 722, in some implementations, the call message is automatically removed from storage by the system after it has been output. For example, the call message is deleted from storage or marked for such deletion by the system providing the output in block 720. In some implementations, the call message is retained and is only deleted in response to receiving user input that instructs such deletion.

FIGS. 8A-8D are diagrammatic illustrations of example representations of a user interface showing one or more features described herein, according to some implementations. FIGS. 8A-8D each show an example user interface displayed on a display of caller device, e.g., a display screen. Some reference numerals are omitted from FIGS. 8A-8D for simplicity. User selections of various elements displayed in the user interfaces can be made via any of various types of user input, e.g., touch input on a touchscreen, speaking a voice command sensed by a microphone, manipulating a physical input device (mouse, joystick, trackpad, etc.), inputting a motion command by moving the device in a pre-configured manner as detected by motion sensors of the callee device, etc.

In FIG. 8A, a first example user interface 800 is illustrated. As illustrated in FIG. 8A, a notification 802 is displayed in the user interface 800 of the caller device after the caller device has transmitted, in this example, a call request for a video call and a caller preview video to a callee device (e.g., as described for blocks 310-330 of FIG. 3 or blocks 610-618 of FIG. 6), and an acceptance of the call request from the callee device has not been received by the caller device. For example, notification 802 is displayed after a timeout has occurred for the call request, such that a predefined period of time associated with the call request has expired. In this example, the call request has also been terminated.

The notification 802 can include an indication 801 that the callee is not available for the requested call or has not answered the call. The notification can also include one or more displayed elements or options enabling the caller to perform one or more actions. In this example, options 804 are displayed on the caller device in the notification 802, one of which can be selected by the caller with user input. For example, option 806 provides an option to send a call message to the callee, where the call message is based on the caller preview video that was previously sent to the callee device. Option 808 provides an option to record a new call message to be sent to the callee device. Option 810 provides an option to send no call message to the callee device. In some implementations, two or more options can be selected. For example, some implementations can allow a caller to select option 806 and option 808 to cause both a call message based on the caller preview video, and a new recorded message, to be transmitted to the callee device.

In FIG. 8B, an example implementation of user confirmation for sending is shown in user interface 800, which can be displayed, for example, after the caller has selected option 806 shown in FIG. 8A to send a call message to the callee that is based on the caller preview video. In this example, prior to sending the caller preview video as the call message, a prompt 811 is displayed in user interface 800 which requests the caller to indicate whether to send the caller preview video as the call message or to edit the caller preview video before sending it as a call message. For example, an option 812 can be displayed which, if selected by the caller with user input, causes an editing interface to be displayed by the caller device, where the caller preview video is selected for editing in the editing interface. Examples of such an interface are described below. The editing interface allows the caller to edit the caller preview video before it is sent to the callee device as the call message. Another option 814 can be displayed which, if selected by the caller with user input, causes the entire caller preview video to be sent as the call message.

In FIG. 8C, an example implementation of a sending function of user interface 800 is shown, which can be displayed in response to the caller selecting option 814 shown in FIG. 8B to send the caller preview video. In this example, the entire caller preview video is sent as the call message to the callee device, and this is indicated by notification 816 displayed in the user interface 800. For example, the caller preview video that was stored in storage accessible to the caller device is sent over an established connection with the callee device. In some implementations, the user interface of FIG. 8C can be displayed directly in response to the user selecting option 806 shown in FIG. 8A to send a call message to the callee that is based on the caller preview video, e.g., such that the options of FIG. 8B are omitted and the entire caller preview video is automatically sent as the call message to the callee device.

In FIG. 8D, an example implementation of a recording function of user interface 800 is shown, which can be displayed, for example, after the caller has selected option 808 shown in FIG. 8A to record a new call message to send to the callee device. In this example, a recording of a video message has been initiated, where a window 820 is displayed and shows the current frames of the video that is a live video being captured by a camera of the caller device. For example, a front camera of the caller device can be directed toward the caller and record the caller speaking, as shown. In another example, the video can be live video being captured by the back camera of the caller device, which captures a scene located in the view of the back camera. In still another example, the recorded video can be a pre-stored or pre-recorded video that is retrieved from storage accessible to the caller device and to which recorded video frames are added at a designated place or point in the frame sequence of the video (e.g., at the beginning of the stored video, at the end, etc.). One or more microphones of the caller device can record sound as audio data accompanying the captured video, e.g., the caller's speech, sounds in the environment of the caller device, etc.

The caller can select a "cancel" control 822 to cancel the call message and delete any frames that have been recorded in the message, or can select a "done" control 824 to stop the recording and keep the recorded message. In some implementations, after the "done" control 824 is selected, an option can be displayed allowing the user to edit the newly-recorded message. Some implementations can allow the caller to record an audio-only message, and/or to capture one or more images (e.g., single snapshots) from the camera to include in a call message.

In FIG. 8E, an example implementation of an editing interface 850 of the user interface 800 is shown. In some examples, the editing interface 850 can be displayed in response to the caller selecting to edit the caller preview video after selecting option 806 to send a call message based on the caller preview video as shown in FIG. 8B. In some examples, the editing interface 850 can be displayed in response to the caller selecting to edit a newly-recorded message, e.g., as shown in FIG. 8D. The editing interface 850 includes a display window 852 for displaying a current frame or image of the edited video, and can include one or more controls to display and/or edit the frames of the video. For example, controls 854 can control playback of the video in the display window 852, and controls 856 can control selection, deletion, and addition of frames. In some examples, additional menus and selections can be displayed allowing caller selection of frames or special effects to be added, colors, brightness, contrast to be changed, frames to be moved within the video, or other changes to the selected video to be made. A send control 858 can be displayed to enable an edited video to be sent to the callee device as a call message in response to receiving the caller's selection of the control 858.

Figure 9A:
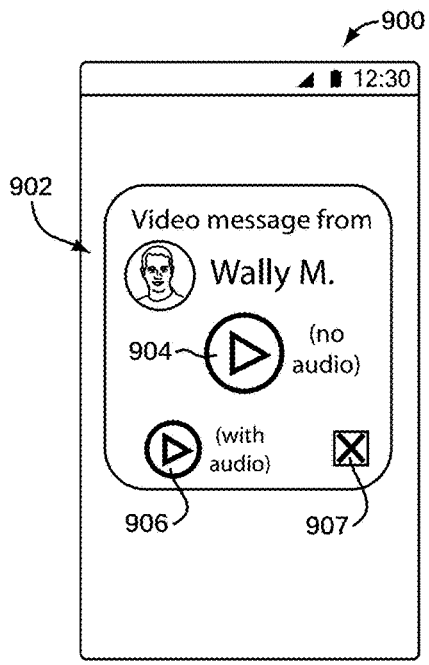
FIGS. 9A-9D are diagrammatic illustrations of example representations of a user interface showing one or more call message features described herein for a callee, according to some implementations.

In FIG. 9A, an example implementation of a user interface 900 is shown, which can be displayed by display of a callee device in response to the callee device receiving a call message from a caller device. In this example, the user interface 900 displays a notification 902 that indicates that a call message has been received and identifies the caller who sent the call message. The call message may have been transmitted by the caller device over an established connection after previously transmitting caller preview data. Alternatively, the call message may have been formed from a previously-received call message, e.g., based on data locally available to the callee device that was previously received in a caller preview video from the caller device. As described herein for FIGS. 8A-8E, the call message in this example can include video data (e.g., video frames obtained from live video captured by the caller device) and/or other stored video, audio data, text data, etc.

In this example, a play control 904 is displayed in the notification which, if selected by the callee, causes the received call message to be displayed, e.g., in a video window or other interface area. In this example, the play control 904 causes video data to be displayed without playing any accompanying audio data, e.g., as a default. In some implementations, a play control 906 can be displayed in user interface 900, which, when selected by user input, causes the received video call message to be displayed and any associated audio data to also be output by the callee device, e.g., by speakers of the callee device. A close button 907 can be selected to remove the notification 902 from the display.

Figure 9B:
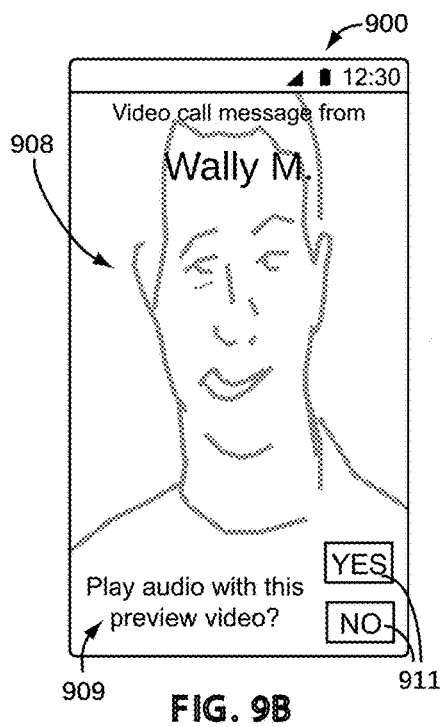

In FIG. 9B, an example implementation of call message playback in user interface 900 is shown. In this example, the user has selected play control 904 shown in FIG. 9A and the corresponding video call message 908 is played in the user interface 900. In this example, the call message depicts the caller. Audio from any associated audio data is not output based on the selected control 904. In some implementations, an audio option message 909 can be displayed in the user interface 900 to provide an option to the callee to select whether or not associated audio data is to be output. For example, the callee can select one of the options 911 to enable or disable the audio output. In some implementations, callee preferences can determine whether audio data in a call message is output and/or whether speech in the audio data is automatically transcribed to text, e.g., by the callee device or other device, where the text can be displayed in user interface 900 in timed correspondence with its associated audio.

Figure 9C:
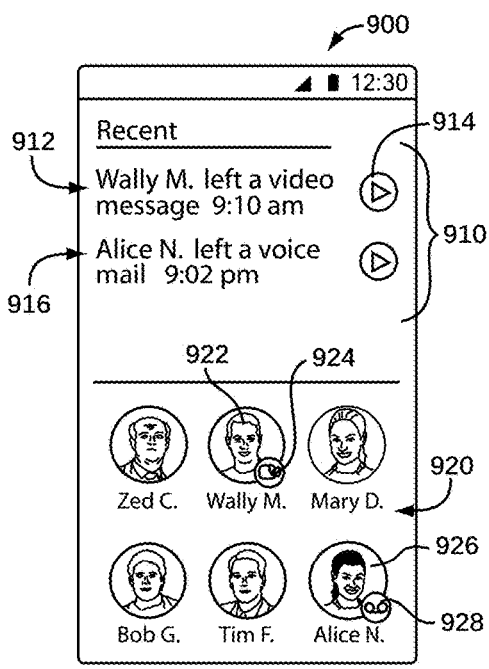

In FIG. 9C, an example implementation of call message list and selection functions of user interface 900 is shown, which can be displayed by a callee device or other device. In this example, a displayed list 910 shows identifications of call messages that have been received by the callee device (or received by an account of the callee that can be view on any of multiple callee devices). For example, a call message 912 is listed which corresponds to the call message shown in the notification 902 of FIG. 9A. In this example, the time of receiving the call message 912 is also displayed, and a play control 914 is provided to cause the call message 912 to be output if the play control 914 is selected by the callee. In this example, other call messages are also displayed in the list 910, including a voice mail message 916 received from a different caller and which is an audio-only call message. In some implementations, the call messages identified in list 910 have not yet been played by the callee, and are removed from the list 910 once they are at least partially played. In some implementations, a call message is removed from storage (e.g., deleted) after it has been played by the callee. Some implementations can display all received call messages whether played or not, e.g., where displayed indications can indicate which call messages in the list 910 have been played by the callee.

In some examples, a display area 920 can be displayed in user interface 900 which includes identifications of users in the callee's address book or contact list. Users which have left pending or unplayed call messages can be displayed with an indicator in the display area 920. For example, user identifier 922 identifies a user who provided call message 912 and can be displayed with a video message icon 924 indicating that the associated user has left a call message that has not yet been played by the callee. Similarly, user identifier 926 is displayed with a voice mail icon 928 to indicate that the voice mail message 916 (audio message without video data) has been provided by the associated user.

Figure 9D:
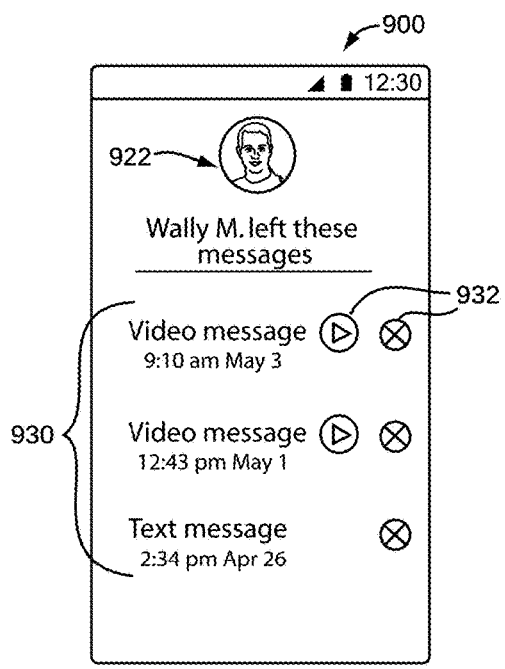

In FIG. 9D, an example implementation of a call message listing of a particular user in user interface 900 is shown, which can be displayed by the callee device or other device. In this example, the callee has selected the user identifier 922 of FIG. 9C, and in response, a listing of call messages 930 received from the user associated with the user identifier 922 is displayed. The callee can select to play or delete any of the listed messages using controls 932. The listing of call messages 930, in this example, include video messages and a text message, and can also include audio messages and other types of messages.

The blocks and operations described in the methods disclosed herein can be performed in a different order than shown or described, and/or performed simultaneously (partially or completely) with other blocks or operations, where appropriate. Some blocks can be performed for one portion of data and later performed again, e.g., for another portion of data. Not all of the described blocks and operations need be performed in various implementations. In some implementations, blocks and operations can be performed multiple times, in a different order, and/or at different times in the methods.

In some implementations, some or all of the methods can be implemented on a system such as one or more client devices 120, 122, 124, or 126 as shown in FIG. 1. In some implementations, one or more methods described herein can be implemented, for example, on a server system 102 as shown in FIG. 1, and/or on both a server system and a client system. In some implementations, different components of one or more servers and/or clients can perform different blocks, operations, or other parts of the methods.

Figure 10:
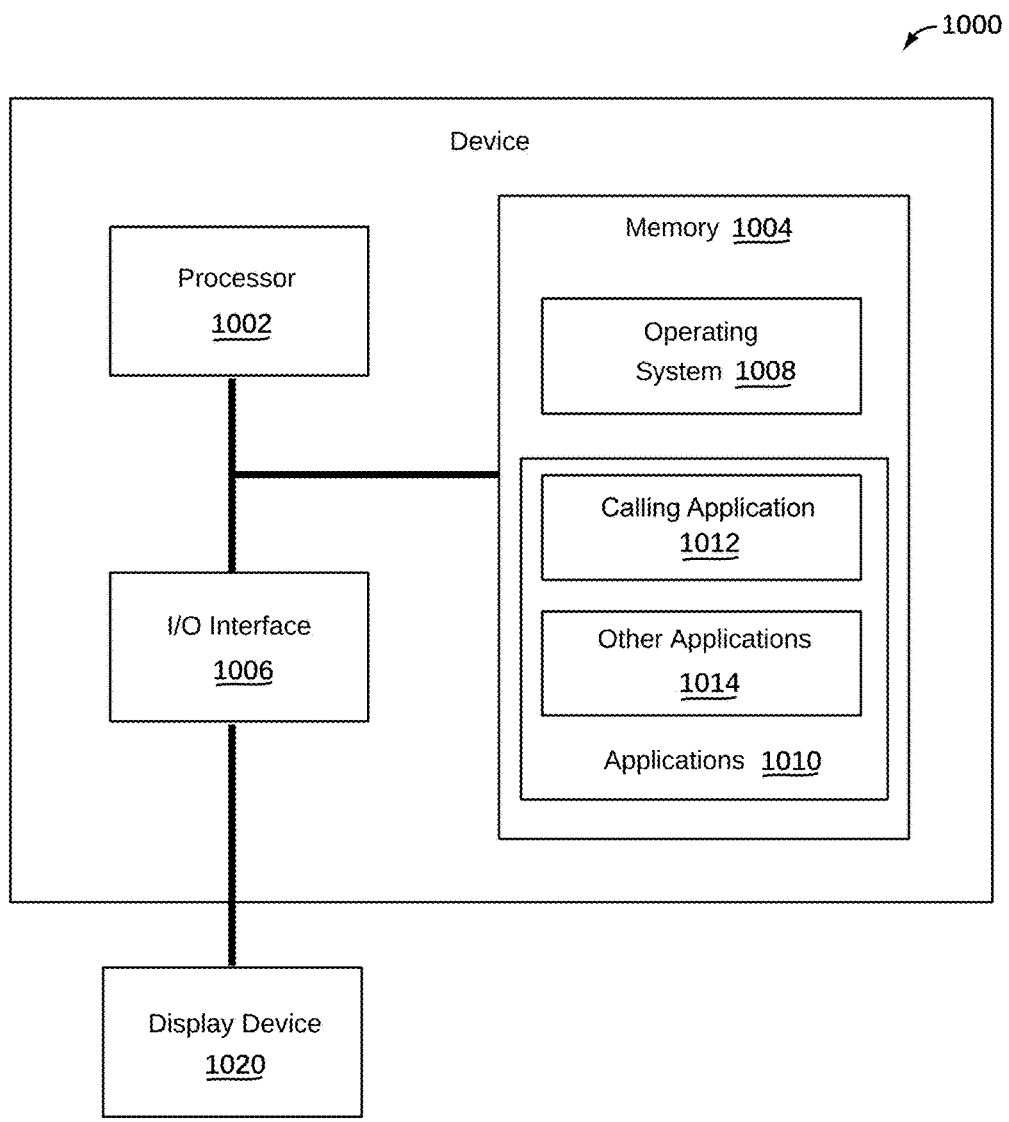
FIG. 10 is a block diagram of an example device which may be used for one or more implementations described herein.

FIG. 10 is a block diagram of an example device 1000 which may be used to implement some implementations described herein. In one example, device 1000 may be used to implement a computer device that implements a server device, e.g., server device 104 of FIG. 1, and perform appropriate method implementations, or portions thereof, described herein. Device 1000 can be any suitable computer system, server, or other electronic or hardware device. For example, the device 1000 can be a mainframe computer, desktop computer, workstation, portable computer, or electronic device (portable device, cell phone, smart phone, tablet computer, television, TV set top box, personal digital assistant (PDA), media player, game device, wearable device, remote control, handheld game- or device-controller, etc.).

One or more methods described herein can be run in a standalone program that can be run on any type of computing device, a program run on a web browser, a mobile application ("app") run on a mobile computing device (e.g., cell phone, smart phone, tablet computer, wearable device (wristwatch, armband, jewelry, headwear, goggles, glasses, etc.), laptop computer, etc.). In one example, a client/server architecture can be used, e.g., a mobile computing device (as a client device) sends user input data to a server device and receives from the server the final output data for output (e.g., for display). In another example, all computations can be performed within the mobile app (and/or other apps) on the mobile computing device. In another example, computations can be split between the mobile computing device and one or more server devices.

In some implementations, device 1000 includes a processor 1002, a memory 1004, and input/output (I/O) interface 1006. Processor 1002 can be one or more processors and/or processing circuits to execute program code and control basic operations of the device 1000. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 1004 is typically provided in device 1000 for access by the processor 1002, and may be any suitable processor-readable storage medium, such as random access memory (RAM), read-only memory (ROM), Electrical Erasable Read-only Memory (EEPROM), Flash memory, etc., suitable for storing instructions for execution by the processor, and located separate from processor 1002 and/or integrated therewith. Memory 1004 can store software operating on the server device 1000 by the processor 1002, including an operating system 1008 and one or more applications 1010 such as a data display engine, web hosting engine, image display engine, notification engine, social networking engine, etc. In some implementations, the applications 1010 can include instructions that enable processor 1002 to perform functions described herein, e.g., some or all of the methods of FIGS. 2-4 and 6-7. For example, applications 1010 can include one or more calling or communication applications 1012, including a program to enable sending of calls to other devices, display or playback of caller preview data on a display device and/or other output device of the device 1000, sending call messages to other devices, and playback of call messages on the display device of the device 1000. A communication program, for example, can provide a displayed user interface responsive to user input to display selectable options/controls, user contacts, and communicated data based on selected options. Other applications or engines 1014 can also or alternatively be included in applications 1010, e.g., image editing applications, media display applications, web hosting engine or application, etc. One or more methods disclosed herein can operate in several environments and platforms, e.g., as a stand-alone computer program that can run on any type of computing device, as a web application having web pages, as a mobile application ("app") run on a mobile computing device, etc.

Any of software in memory 1004 can alternatively be stored on any other suitable storage location or computer-readable medium. In addition, memory 1004 (and/or other connected storage device(s)) can store images, image metadata (including video call settings, etc.), contact information, data structures, and other information, user preferences, and/or other instructions and data used in the features described herein. Memory 1004 and any other type of storage (magnetic disk, optical disk, magnetic tape, or other tangible media) can be considered "storage" or "storage devices."

I/O interface 1006 can provide functions to enable interfacing the server device 1000 with other systems and devices. For example, network communication devices, storage devices (e.g., memory and/or database 106), and input/output devices can communicate via I/O interface 1006. In some implementations, the I/O interface can connect to interface devices such as input devices (keyboard, pointing device, touchscreen, microphone, camera, scanner, etc.) and/or output devices (display device, speaker devices, printer, motor, etc.). Display device 1020 is one example of an output device that can be used to display content, e.g., one or more videos, images, animations, contact information, etc. provided in a user interface of an output application as described herein. Display device 1020 can be connected to device 1000 via local connections (e.g., display bus) and/or via networked connections and can be any suitable display device, some examples of which are described below.

For ease of illustration, FIG. 10 shows one block for each of processor 1002, memory 1004, I/O interface 1006, and software blocks 1008 and 1010. These blocks may represent one or more processors or processing circuitries, operating systems, memories, I/O interfaces, applications, and/or software modules. In other implementations, server device 1000 may not have all of the components shown and/or may have other elements including other types of elements instead of, or in addition to, those shown herein. While system 102 is described as performing blocks and operations as described in some implementations herein, any suitable component or combination of components of system 102 or similar system, or any suitable processor or processors associated with such a system, may perform the blocks and operations described.

A client device can also implement and/or be used with one or more features described herein, e.g., client devices 120-126 shown in FIG. 1. Example client devices can include some similar components as the device 1000, such as processor(s) 1002, memory 1004, and I/O interface 1006. An operating system, software and applications suitable for the client device can be provided in memory and used by the processor, e.g., video calling software, client group communication application software, etc. The I/O interface for a client device can be connected to network communication devices, as well as to input and output devices, e.g., a microphone for capturing sound, GPS sensor for sensing geographic location, one or more cameras for capturing images or video, audio speaker devices for outputting audio, one or more companion devices in communication with the device 1000, a display device for outputting images or video, and/or other input and output devices. A display device 1020, for example, can be connected to or included in device 1000 to display images as described herein, where such device can include any suitable display device such as an LCD, LED, or plasma display screen, CRT, television, monitor, touchscreen, 3-D display screen, projector, or other visual display device. Some implementations can provide an audio output device, such as voice output or synthesis that speaks text.

Methods described herein can be implemented by computer program instructions or code, which can be executed on a computer. For example, the code can be implemented by one or more digital processors (e.g., microprocessors or other processing circuitry) and can be stored on a computer program product including a non-transitory computer readable medium (e.g., storage medium), such as a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g. Field-Programmable Gate Array (FPGA), Complex Programmable Logic Device), general purpose processors, graphics processors, Application Specific Integrated Circuits (ASICs), and the like. One or more methods can be performed as part of or component of an application running on the system, or as an application or software running in conjunction with other applications and operating system.

Although the description has been described with respect to particular implementations thereof, these particular implementations are merely illustrative, and not restrictive. Concepts illustrated in the examples may be applied to other examples and implementations.

In situations in which certain implementations discussed herein may collect or use personal information about users (e.g., user data, information about a user's social network, user's location and time, user's biometric information, user's activities and demographic information), users are provided with one or more opportunities to control whether the personal information is collected, whether the personal information is stored, whether the personal information is used, and how the information is collected about the user, stored and used. That is, the systems and methods discussed herein collect, store and/or use user personal information only upon receiving explicit authorization from the relevant users to do so. In addition, certain data may be treated in one or more ways before it is stored or used so that personally identifiable information is removed. As one example, a user's identity may be treated so that no personally identifiable information can be determined. As another example, a user's geographic location may be generalized to a larger region so that the user's particular location cannot be determined.

Note that the functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed such as procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

The invention claimed is:

1. A method comprising:
sending, by a caller device, a call request to one or more callee devices;
establishing a connection to at least one callee device of the one or more callee devices prior to receipt of an acceptance of the call request by the at least one callee device;
transmitting at least a portion of caller preview data to the at least one callee device over the connection, wherein the at least a portion of the caller preview data is transmitted prior to the receipt of the acceptance of the call request; and
in response to determining that the at least a portion of the caller preview data has been transmitted over the connection for a particular time period without the receipt of the acceptance of the call request, transmitting information to the at least one callee device that instructs that a call message be stored on the at least one callee device, wherein the call message includes at least a part of the caller preview data, wherein the at least a part of the caller preview data included in the call message is at least one of audio data and video data at a different resolution than at least one of audio data and video data in the transmitted at least a portion of the caller preview data.

2. The method of claim 1, further comprising storing the caller preview data in storage of the caller device, wherein transmitting the information to the at least one callee device includes transmitting the call message to the at least one callee device over the connection.

3. The method of claim 1, wherein transmitting the information to the at least one callee device includes transmitting a command to the at least one callee device over the connection, wherein the command instructs the at least one callee device to store the transmitted at least a portion of the caller preview data as the call message.

4. The method of claim 3, further comprising transmitting an additional portion of the caller preview data to the at least one callee device, wherein the command instructs the at least one callee device to combine the additional portion with the transmitted at least a portion of the caller preview data as the call message.

5. The method of claim 1 wherein the caller preview data includes one of:

video data exclusive of audio data;
audio data exclusive of video data; and
both video data and audio data.

6. The method of claim 1 wherein the call message includes a text message that includes text associated with audio data included in the caller preview data.

7. The method of claim 1 further comprising:
causing capture of the caller preview data by one or more cameras in communication with the caller device; and
providing an automatic suggestion on the caller device requesting user input that indicates whether the caller preview data is to be provided as the call message, wherein the automatic suggestion is provided in response to at least one of:
determining that one or more particular content features are included in one or more portions of the caller preview data; and
determining that a particular social relationship exists between a caller user of the caller device and at least one callee user of the at least one callee device.

8. The method of claim 2 further comprising:
obtaining the caller preview data from a camera of the caller device that captures the caller preview data; and
causing output by the caller device of an indication that the caller preview data is being stored on the caller device, wherein the at least a part of the caller preview data is available to be provided as the call message.

9. The method of claim 1, further comprising, in response to determining that the caller preview data has been transmitted over the connection for the particular time period without receiving the acceptance of the call request:
causing display of a plurality of options by the caller device, wherein the plurality of options include:
a first option to use the at least a part of the caller preview data as the call message, wherein transmitting the information to the at least one callee device is performed in response to receiving first input selecting the first option; and
a second option to reject including the at least a part of the caller preview data in the call message, wherein in response to receiving second input selecting the second option, determination of a new call message by the caller device is caused to be initiated.

10. The method of claim 9, wherein causing display of the plurality of options by the caller device includes causing display of a user interface by the caller device including one or more controls receptive to third input from the user and configured to cause output of one or more portions of the caller preview data by the caller device prior to transmitting the information.

11. The method of claim 1, further comprising:
receiving edit input from a caller of the caller device; and
editing the caller preview data based on the edit input to generate edited caller preview data, wherein the edited caller preview data is transmitted to the callee device as the call message.

12. The method of claim 11, wherein the caller preview data includes sequential data, and wherein receiving the edit input from the caller includes receiving one or more selections of at least one of:
a start point of the caller preview data, such that portions of the sequential data prior to the start point are caused to be excluded from the caller preview data, and
an end point of the caller preview video, such that portions of the sequential data after the end point are caused to be excluded from the caller preview data.

13. The method of claim 1, further comprising automatically verifying that one or more visual features are depicted in pixels in one or more frames of the caller preview data, wherein the causing the call message to be stored on the at least one callee device is performed in response to verifying that the one or more visual features are depicted.

14. The method of claim 1, further comprising:
automatically determining one or more content features depicted in the caller preview data; and
automatically modifying the caller preview data to generate modified caller preview data, wherein the modified caller preview data excludes one or more frames of the caller preview data that include the one or more content features, wherein the modified caller preview data is included in the information transmitted to the at least one callee device.

15. The method of claim 1, further comprising:
detecting speech in audio data associated with the caller preview data;
obtaining one or more text captions corresponding to the speech, wherein each text caption of the one or more text captions corresponds to a portion of the speech; and
causing particular text captions of the one or more text captions to be inserted into respective frames of the caller preview data that are associated with the portions of the speech corresponding to the particular text captions.

16. A device comprising:
a storage device; and
at least one processor configured to access the storage device, the at least one processor configured to perform operations comprising:
sending, by a caller device, a call request to one or more callee devices;
establishing a connection to at least one callee device of the one or more callee devices prior to receipt of an acceptance of the call request by the at least one callee device;
storing at least a portion of caller preview data captured by the caller device, wherein the caller preview data includes at least one of video data and audio data;
transmitting at least a portion of the caller preview data to the at least one callee device over the connection, wherein the at least a portion of the caller preview data is transmitted prior to the receipt of the acceptance of the call request, wherein the at least a portion of the caller preview data is at least one of video data and audio data at a first resolution; and
in response to determining that at least a portion of the caller preview data has been transmitted over the connection and the acceptance of the call request has not been received, transmitting a call message over the connection to the at least one callee device, wherein the call message includes at least a part of the caller preview data, wherein the at least a part of the caller preview data included in the call message is at least one of video data and audio data at a second resolution, wherein the second resolution is different than the first resolution.

17. A method comprising:
receiving, by a callee device, a call request from a caller device;
establishing a connection to the caller device prior to sending an acceptance of the call request by the callee device;

receiving caller preview data at the callee device over the connection, wherein the at least a portion of the caller preview data is received prior to the sending of the acceptance of the call request by the callee device, wherein the at least a portion of the caller preview data is at least one of video data and audio data at a first resolution;

causing output of the caller preview data by the callee device; and in response to the caller preview data being received over the connection for a particular time period without the sending of the acceptance of the call request, receiving a call message from the caller device over the connection to be stored in storage of the callee device, wherein the call message includes at least a part of the caller preview data, wherein the at least a part of the caller preview data included in the call message is at least one of video data and audio data at a second resolution, wherein the second resolution is different than the first resolution.

18. The method of claim 17, further comprising:

causing display of an audio output option at the callee device in association with the caller preview data, wherein the audio output option is responsive to user selection to cause audio data associated with the caller preview data to be output by the callee device; and in response to the caller preview data being received over the connection for the particular time period without the sending of the acceptance of the call request, receiving the call message from the caller device.

19. The method of claim 17 wherein causing output of the caller preview data by the callee device includes causing audio output by the callee device based on the caller preview data in place of ringtone audio output caused by ringtone data accessible to the callee device.

* * * * *